US011906960B1

(12) United States Patent
Gonzalez

(10) Patent No.: US 11,906,960 B1
(45) Date of Patent: Feb. 20, 2024

(54) BAYESIAN RISK INFERENCE ENGINE (BRIE)

(71) Applicant: UPTAKE TECHNOLOGIES, INC., Chicago, IL (US)

(72) Inventor: Ruben Gonzalez, Chicago, IL (US)

(73) Assignee: UPTAKE TECHNOLOGIES, INC., Chicago, IL (US)

(*) Notice: Subject to any disclaimer, the term of this patent is extended or adjusted under 35 U.S.C. 154(b) by 0 days.

(21) Appl. No.: 17/972,023

(22) Filed: Oct. 24, 2022

(51) Int. Cl.
*G05B 23/02* (2006.01)

(52) U.S. Cl.
CPC ....... *G05B 23/0283* (2013.01); *G05B 23/024* (2013.01); *G05B 23/0216* (2013.01)

(58) Field of Classification Search
CPC ............ G05B 23/0283; G05B 23/0216; G05B 23/024
See application file for complete search history.

(56) References Cited

U.S. PATENT DOCUMENTS

2022/0057766 A1* 2/2022 Cao .................... G05B 23/0283
2022/0058497 A1* 2/2022 Vazquez-Canteli .... G05B 15/02

OTHER PUBLICATIONS

Gonzalez, "Bayesian Solutions to Control Loop Diagnosis," Department of Chemical and Materials Engineering, University of Alberta (2014).
M. Abdel-Hameed, "Gamma degradation process," Levy Processes and Their Applications in Reliability and Storage, Springer, pp. 1-7 (2013).
Mosallam et al., "Bayesian Approach for Remaining Useful Life Prediction," Chemical Engineering Transactions, vol. 33 (2014).
Qi et al., "Dynamic Bayesian Approach for Control Loop Diagnosis with Underlying Mode Dependency," Ind. Eng. Chem. Res., 49(18): 863-8623 (2010).
Sun et al., "Gamma Degradation Process and Accelerated Model Combined Reliability Analysis Method for Rubber O-Rings," IEEE Access, 6: 10581-90 (2018).
Wang et al., "Degradation data analysis based on gamma process with random effects," European Journal of Operational Research, 292(3): 1200-1208 (2021).

* cited by examiner

*Primary Examiner* — Manuel L Barbee
(74) *Attorney, Agent, or Firm* — MARSHALL, GERSTEIN & BORUN LLP

(57) ABSTRACT

A computing platform is configured to: (a) generate a predicted health distribution of an asset for a failure mode based on a prior health distribution and a wear rate distribution. The computing platform is further configured to (b) update, the predicted health distribution based on (i) an observed state distribution corresponding to an observed state associated with the asset and (ii) a normalized value representative of a probability of the observed state over one or more health values of the asset. The computing platform is further configured to (c) generate a survival curve of the asset based on the predicted health distribution and a set of wear rates; iteratively perform (a)-(c) for each failure mode of the set of failure modes; aggregate the survival curve for each failure mode into an aggregate survival curve; and cause a client device to display a visual representation of the aggregate survival curve.

20 Claims, 10 Drawing Sheets

US 11,906,960 B1

BAYESIAN RISK INFERENCE ENGINE (BRIE)

FIELD OF THE DISCLOSURE

The present invention is generally related to the field of asset survival rate (or remaining useful life (RUL)) prediction, and more specifically a Bayesian risk inference engine (BRIE) that efficiently and accurately predicts and projects such asset survival rates into future time instances.

BACKGROUND

Today, machines (also referred to herein as "assets") are ubiquitous in many industries. From locomotives that transfer cargo across countries to farming equipment that harvest crops, assets play an important role in everyday life. Depending on the role that an asset serves, its complexity, and cost, may vary.

Because of the increasing role that assets play, it is also becoming increasingly desirable to monitor and analyze the operation of assets in a given operating environment over a given duration of time. In particular, it may be desirable to monitor and analyze the operation of assets to help reduce an asset owner's operating expenses and thus increase the asset owner's overall profit. Part of this monitoring and analysis commonly extends to determining an expected remaining useful life (RUL) of an asset through survival curves. Conventional RUL determinations have yielded many beneficial results across the panoply of industries invested in preserving asset life and predicting maintenance schedules or asset replacement schedules. Nevertheless, these conventional RUL determinations suffer from a number of drawbacks.

Among other issues, conventional RUL determinations/models generally assume unchanging wear rates during subsequent time periods for which wear is iteratively modeled. However, in practice, wear rates are a product of operating conditions which can fluctuate and be inferred through real-time data. While some conventional RUL models are capable of handling real-time data in the form of wear-rate predictors, the underlying assumptions for these conventional models can be so limiting that such conventional models are unable to utilize dynamic wear rate predictions. As a result, these conventional RUL models are generally incapable of efficiently providing accurate survival curves for assets, and such conventional RUL models also fail to reliably project such survival curves into future time instances. Thus, conventional RUL models often overwhelm processing and memory resources and create undesirable inefficiencies and inaccuracies.

Accordingly, a need arises for a Bayesian risk inference engine (BRIE) that is capable of providing reliable, efficient, and accurate survival curves for assets that can be projected into future time instances, and thereby enable users to utilize such accurate, up-to-date survival predictions for scheduling maintenance and/or replacement of respective assets.

SUMMARY

Generally, the BRIE of the present disclosure is capable of generating reliable, accurate survival curves for assets that can be projected into future time instances by fusing an expert-driven model with condition-based alarms that indicate asset health. In particular, the BRIE of the present disclosure may utilize a wide body of experts to determine a variety of possibilities related to how quickly various asset components wear out, statically adjust those possibilities for average wear-rates of assets during their lifecycles, utilize condition-based alarms to dynamically filter down those possibilities, and utilize a dynamic wear rate over the current asset lifecycle when determining health states (also referenced herein as a "health distribution").

As mentioned, conventional techniques only allow the wear rate to change when the component is replaced. However, this is a potentially inaccurate assumption, particularly because many condition-based monitoring systems provide alarms on near-end-of-life indicators as well as stress indicators. The existence of such stress-based alarms suggest that changes in wear-rates happen, and that they are of particular interest. Many conventional techniques are not built to handle dynamic stress and changing wear rates, and instead assume a prior distribution of constant wear rates. Stressors are typically used to modify the distribution that is used to generate a distribution of failure times, and generally do not include dynamic information at all.

In a static case, conventional models that assume constant average wear rates are generally acceptable. But when evaluating dynamically, constant wear rate assumptions tend to result in such conventional models being overconfident and brittle as a result of such conventional models assuming a perfect model of temporal dependence. As conventional techniques filter out more and more linear possibilities from constant wear rates, these techniques/models narrow down the time expected for the assets to fail. However, such conventional techniques do not consider possibilities stemming from non-constant wear rates, such that these valid possibilities are not considered in the final estimate. In the end, these conventional techniques/models often reach a point where there are no possible linear trajectories to explain the data, resulting in a theoretical impossibility and a failure for the simulation to converge.

To avoid these issues stemming from conventional techniques, the BRIE of the present disclosure, inter alia, does not assume a constant wear-rate. Instead, the BRIE of the present disclosure, generally assumes an additive independent sequence of random wear events, known as a random-walk model. Wear rates may not be independent, but independence assumptions communicate maximum ignorance and therefore follow the principle of insufficient reason. Moreover, the BRIE of the present disclosure is configured to accommodate wear rates that are temporally dependent. Thus, the BRIE of the present disclosure improves over conventional techniques at least by providing a significantly more rigorous treatment of the uncertainty in wear rates, which grows over time.

Further, the present BRIE improves over conventional systems by providing a dynamic solution that can combine expert knowledge with real-time data. As mentioned, conventional systems are typically built on static assumptions, such that these conventional systems are incapable of accommodating any level of temporal independence for wear rates, dynamic and changing stress sources, and dynamic observations of the asset states. By contrast, the BRIE of the present disclosure is able to incorporate these and other considerations, and thereby yields more accurate predictions. Moreover, as a result of including these considerations, the BRIE of the present disclosure also helps operators and engineers troubleshoot degradation while providing them with a better view of the underlying causes. The BRIE also provides an entry-point to enable machine learning (ML)-based models to predict how much degradation is caused by operational scenarios and feed that information to the BRIE accordingly.

More specifically, Bayesian inference is the underlying framework or model for the BRIE, and this framework enables the BRIE to provide many of the advantages described herein. In particular, Bayesian inference enables the BRIE to apply information fusion on much more complicated systems than conventional techniques, including dynamic systems. Importantly, Bayesian inference enables the BRIE to dynamically apply predictive models and subsequently update the resulting predictions based on observations. By applying Bayesian inference through the BRIE, the present techniques keep all previous benefits of conventional techniques, but improve over these conventional techniques by gaining multiple advantageous capabilities.

Namely, the BRIE is configured to dynamically apply stress with surgical precision using predictive models by eliminating the underlying assumption of conventional techniques that wear-rate is constant throughout an asset lifecycle. Further, the BRIE framework enables the application of machine learning through maximum-likelihood estimation to increase the accuracy of the stress-prediction models. BRIE is also configured to plot key information over time, such as a percentage of asset health remaining, which enables significantly more transparency for users (e.g., engineers) who may inspect the results and potentially gain substantially enhanced engineering insight as compared to conventional systems. For example, rapid drops in the percentage health remaining output by the BRIE may enable users to narrow down the potentially relevant time windows and inspect the data for potential causes in degradation. Additionally, the BRIE may dramatically reduce the amount of time required to produce a result relative to conventional techniques because dynamic Bayesian methods only require a statistical summary of past data (e.g., less than a kilobyte of data) and recent data (e.g., on the order of kilobytes of data) rather than an entire lifecycle history (e.g., hundreds of megabytes or even gigabytes of data), as required by conventional techniques. In particular, the BRIE has yielded performance improvements between 100× and 1000× faster than conventional techniques, depending on the amount of time series data used. Overall, the BRIE is significantly more scalable, incredibly more efficient, and substantially better configured to generate interactive results than conventional techniques.

To attain these and other advantages, the present invention generally comprises a computing platform for generating survival curves for an asset. The computing platform includes: a communication interface; one or more processors; a non-transitory computer-readable medium storing a Bayesian risk inference engine (BRIE); and program instructions stored on the non-transitory computer-readable medium that are executable by the one or more processors to cause the computing platform to: (a) generate, by executing the BRIE, a predicted health distribution of an asset for a failure mode of a set of failure modes based on a prior health distribution of the asset for the failure mode and a wear rate distribution based on sensor data corresponding to the asset, (b) update, by executing the BRIE, the predicted health distribution based on (i) an observed state distribution corresponding to an observed state associated with the asset that is indicative of a health state of the asset represented by the predicted health distribution and (ii) a normalized value representative of a probability of the observed state over one or more health values of the asset, (c) generate, by executing the BRIE, a survival curve of the asset based on the predicted health distribution and a set of wear rates, the survival curve including predictions of a survival probability for the asset at a plurality of future points, iteratively perform (a)-(c) for each failure mode of the set of failure modes, aggregate, by executing the BRIE, the survival curve for each failure mode into an aggregate survival curve of the asset, and cause a client device to display a visual representation of the aggregate survival curve of the asset.

In other embodiments, the present invention generally comprises a computer-implemented method for generating survival curves for an asset. The computer-implemented method includes: (a) generating, by one or more processors executing a Bayesian risk inference engine (BRIE), a predicted health distribution of an asset for a failure mode of a set of failure modes based on a prior health distribution of the asset for the failure mode and a wear rate distribution based on sensor data corresponding to the asset; (b) updating, by the one or more processors executing the BRIE, the predicted health distribution based on (i) an observed state distribution corresponding to an observed state associated with the asset that is indicative of a health state of the asset represented by the predicted health distribution and (ii) a normalized value representative of a probability of the observed state over one or more health values of the asset; (c) generating, by the one or more processors executing the BRIE, a survival curve of the asset based on the predicted health distribution and a set of wear rates, the survival curve including predictions of a survival probability for the asset at a plurality of future points; iteratively performing (a)-(c) for each failure mode of the set of failure modes; aggregating, by the one or more processors executing the BRIE, the survival curve for each failure mode into an aggregate survival curve of the asset; and causing, by the one or more processors, a client device to display a visual representation of the aggregate survival curve of the asset.

In still other embodiments, the present invention generally comprises a tangible, non-transitory computer-readable medium storing instructions for generating survival curves for an asset. The instructions, when executed by one or more processors cause the one or more processors to: (a) generate, by executing a Bayesian risk inference engine (BRIE), a predicted health distribution of an asset for a failure mode of a set of failure modes based on a prior health distribution of the asset for the failure mode and a wear rate distribution based on sensor data corresponding to the asset; (b) update, by executing the BRIE, the predicted health distribution based on (i) an observed state distribution corresponding to an observed state associated with the asset that is indicative of a health state of the asset represented by the predicted health distribution and (ii) a normalized value representative of a probability of the observed state over one or more health values of the asset; (c) generate, by executing the BRIE, a survival curve of the asset based on the predicted health distribution and a set of wear rates, the survival curve including predictions of a survival probability for the asset at a plurality of future points; iteratively perform (a)-(c) for each failure mode of the set of failure modes; aggregate, by executing the BRIE, the survival curve for each failure mode into an aggregate survival curve of the asset; and cause a client device to display a visual representation of the aggregate survival curve of the asset.

In accordance with the above, and with the disclosure herein, the present disclosure includes improvements in computer functionality or in improvements to other technologies at least because the present disclosure describes that, e.g., asset survivability prediction systems, and their related various components, may be improved or enhanced with the disclosed computing platforms, methods, and tangible, non-transitory computer-readable mediums that provide more accurate, reliable, and efficient prediction of the health state and survival probabilities (e.g., via survival curves) of assets. That is, the present disclosure describes improvements in the functioning of a prosthetic device itself or "any other technology or technical field" (e.g., the field of asset survivability prediction) because the disclosed computing platforms, methods, and tangible, non-transitory computer-readable mediums improve and enhance operation, extend prediction time horizons, and reduce error rates, of asset survivability prediction systems by introducing a Bayesian risk inference engine (BRIE) that incorporates dynamic wear-rates and real-time sensor/observation data to eliminate errors and inefficiencies typically experienced over time by asset survivability prediction systems lacking such computing platforms, methods, and tangible, non-transitory computer-readable mediums. This improves over the prior art at least because such previous systems were error-prone as they lack the ability to accurately, consistently, or efficiently predict asset health states and/or survival curves using such dynamic wear-rates or real-time sensor/observation data.

In addition, the present disclosure includes applying various features and functionality, as described herein, with, or by use of, a particular machine, e.g., an asset, one or more sensors, one or more alarms, computing platforms, and/or other hardware components as described herein.

Moreover, the present disclosure includes effecting a transformation or reduction of a particular article to a different state or thing, e.g., transforming or reducing the failure rate, maintenance schedule, and/or overall operation of an asset from a non-optimal or error (e.g., failure) state to an optimal (e.g., healthy) state as a result of accurate health state and survival curve predictions based on dynamic wear-rates and real-time sensor/observation data.

Still further, the present disclosure includes specific features other than what is well-understood, routine, conventional activity in the field, or adding unconventional steps that demonstrate, in various embodiments, particular useful applications, e.g., generating, by executing the BRIE, a predicted health distribution of an asset for a failure mode of a set of failure modes based on a prior health distribution of the asset for the failure mode and a wear rate distribution based on sensor data corresponding to the asset; updating, by executing the BRIE, the predicted health distribution based on (i) an observed state distribution corresponding to an observed state associated with the asset that is indicative of a health state of the asset represented by the predicted health distribution and (ii) a normalized value representative of a probability of the observed state over one or more health values of the asset; and generating, by executing the BRIE, a survival curve of the asset based on the predicted health distribution and a set of wear rates, the survival curve including predictions of a survival probability for the asset at a plurality of future points.

Advantages will become more apparent to those of ordinary skill in the art from the following description of the preferred embodiments, which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Figure 1:
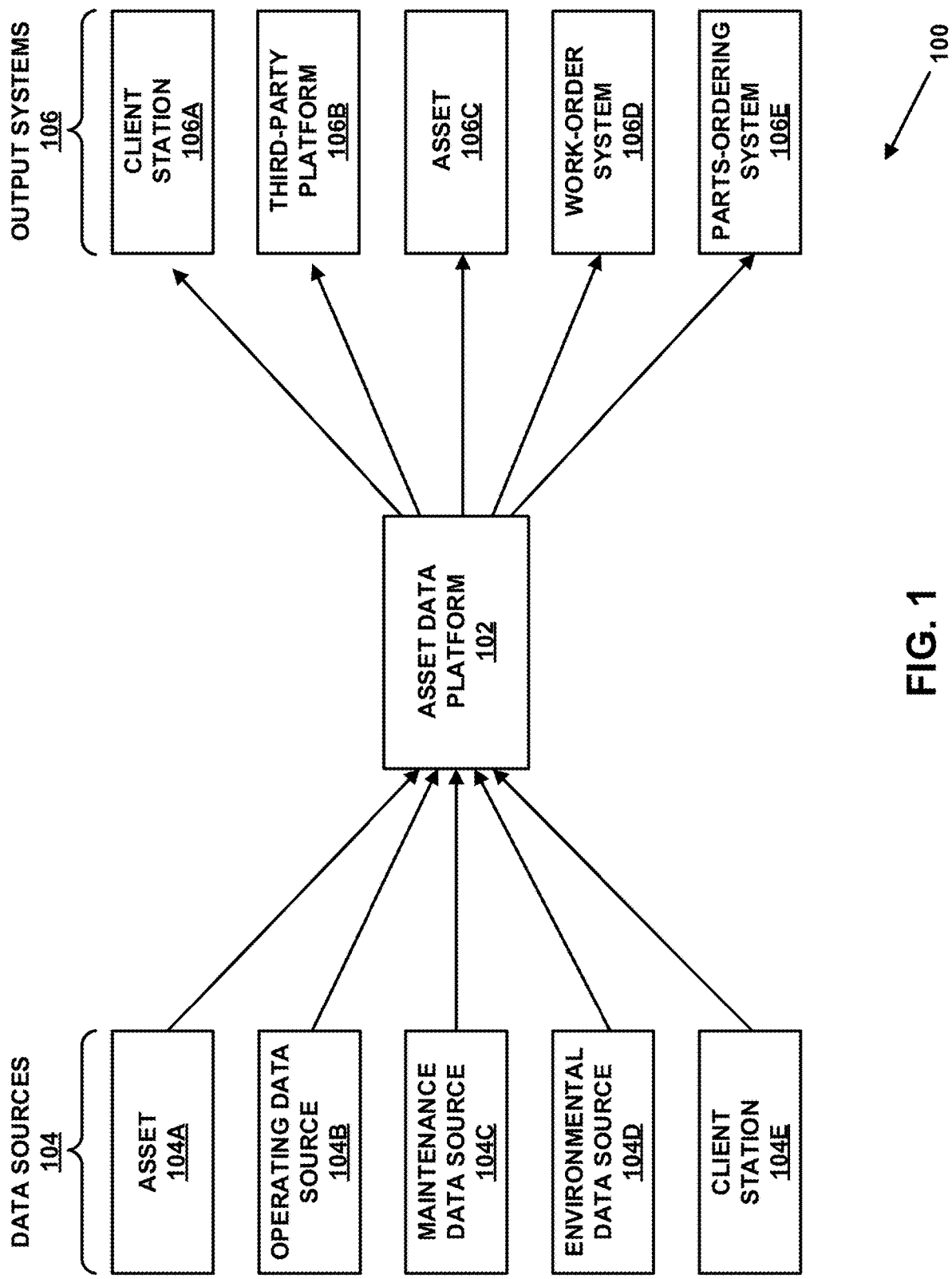
FIG. 1 depicts an example network configuration in which example embodiments may be implemented.

The following disclosure makes reference to the accompanying figures and several example embodiments. One of ordinary skill in the art should understand that such references are for the purpose of explanation only and are therefore not meant to be limiting. Part or all of the disclosed systems, devices, modules, and methods may be rearranged, combined, added to, and/or removed in a variety of manners, each of which is contemplated herein.

As noted above, the present disclosure is directed to a Bayesian risk inference engine (BRIE) that is configured to generate survival curves for assets. In practice, the disclosed BRIE may be incorporated into platform software for management of assets. Section one of the detailed description provides a foundational description of the Bayesian inference framework to inform the subsequent sections. Sections two through four describe a general system/asset/device architecture in which the BRIE may be implemented in order to generate survival curves for assets, in reference FIGS. 1-2D. Section four details specific functionality of the BRIE, in reference to FIGS. 3-7.

I. Bayesian Inference Framework

As mentioned, the techniques disclosed herein generally rely on a Bayesian inference engine to generate the health distributions and survival curves for various assets. The purpose of this section is to provide a better understanding of Bayesian inference to inform the subsequent sections. Broadly speaking, Bayesian methods center around using Bayes' theorem to assess conditional probabilities in view of new evidence. For example, let h be a hypothetical condition of interest, and let e be observational evidence that is affected by h. Note that, at this level, both h and e can be continuous or discrete. The probability distribution of h given e (denoted as p(h|e)) is found using Bayes' Theorem as follows:

$$p(h|e) = \frac{p(e|h)p(h)}{p(e)}, \qquad (1)$$

where p(e|h) is the probability of the evidence given a hypothetical value of h, p(h) is the prior distribution of h, p(e) is a normalization constant representing the probability of e over all possible values of h, and wherein if h is continuous $p(e)=\int p(e|h)p(h)\,dh$, and if h is discrete $p(e)=\Sigma_h p(e|h)p(h)$. Based on these distributions, various approaches can be developed (e.g., Bayesian networks, Hidden Markov Models, Kalman Filters), all of which stem from equation (1).

In general, Bayesian inference enables the development of statistical techniques in a modular manner. Traditionally, statistics have been used to answer simple questions involving hypothesis tests for scientific experiments, risk assessments for simple yet poorly understood phenomena (such as in actuarial practice), and many others. In such cases, the problems are isolated, such that the modularity resulting from Bayesian techniques do not yield significant advantages. However, artificial intelligence applications require statistical inferences about larger more complex systems. In these cases, modularity (particularly through Bayesian methods) becomes vital to building robust, composable, repeatable, and computationally efficient solutions.

When considering multiple sources of evidence that are affected by a common hypothetical condition, it is generally simpler to consider each piece of evidence as conditionally independent. For example, consider a circumstance where three pieces of evidence e[1], e[2], and e[3] are affected by h. Data may suggest that the three pieces of evidence are correlated, but if each piece of evidence is conditioned on h, then the evidence is independent, which enables expression of the probability as:

$$p(h|e) = \frac{p(e[1]|h)p(e[2]|h)p(e[3]|h)p(h)}{p(e)} \qquad (2)$$

As another example, assume that the evidence instead includes only e[1] and e[2]. The traditional approach to adding the third piece of evidence (e[3]) would include abandoning the previous work in creating p(h, e[1], e[2]) and building/training an entirely new, higher-dimensional distribution p(h, e[1], e[2], e[3]). On the other hand, using Bayesian conditioning, this problem simplifies significantly by only requiring the training/building of p(e[3]|h) and appending it to p(h, e[1], e[2]). Thus, instead of building a four-dimensional distribution, the Bayesian conditioning approach leverages three two-dimensional distributions. As a result, using Bayesian conditioning reduces the overall dimensionality of the problem (e.g., an N+1-dimensional problem simplifies to N two-dimensional problems), and Bayesian conditioning enables the addition of evidence in a composable manner, such that adding evidence sources simply requires adding them to the existing evidence source models without affecting those existing models. Overall, these properties enable easy addition of arbitrary instrumentation and measurements to a problem, thereby enabling the simple, straightforward crafting of solutions with different kinds of instrumentation/observations without completely re-developing existing models.

More specifically, a major consequence of Bayesian inference enabling causality modeling with composable evidence is the additional enablement of dynamic inference. Namely, Bayesian inference enables conditioning the belief of h over time by applying Bayesian updates to dynamic models. One such model is the dynamic model transition, reproduced below:

$$P(h_t|h_{t-1}) = f(p(h_{t-1}|e_{t-1})) \qquad (3),$$

where a Bayesian update to equation (3) may be represented as:

$$p(h_t|e_t) = \frac{p(e_t|h_t)p(h_t|h_{t-1})}{p(e_t)}, \qquad (4)$$

and as represented in equation (4), such an updating approach enables recursive and dynamic updating of h over time in a manner that combines predictive models and streamed evidence.

In most Bayesian problems, the prior probability p(h) is where most expert-driven knowledge is placed. If the practitioner is knowledgeable, then prior probabilities incorporating such knowledge are one of the predominant strengths of Bayesian methods because well-chosen priors can harden results against overfitting weak data. Consequently, Bayesian methods enable entities with access to quality expert knowledge to enjoy a competitive advantage in producing reliable machine learning solutions. Nevertheless, when using expert-driven knowledge to influence solutions, defining the prior probability p(h) should include several primary considerations: (1) values that h is allowed to take, (2) uncertainty behind the prior values of h, and (3) uncertainty behind the models that predict e given the values of h. Thus, the Bayesian methods may provide solutions where p(h) contains the belief (and uncertainty) around what the value should be, p(e|h) contains machine learning/modelling information (including uncertainty) related to how h affects the observations, and $p(h|h_1)$ (e.g., in dynamic modelling situations) contains machine learning/modelling information (including uncertainty) related to how h changes over time.

Based on this framework, and as previously mentioned, Bayesian methods yield several advantages that improve over conventional systems. Namely, conventional reliability (i.e., survivability) analysis is performed by experts, and computing machines are only used for specific number-crunching scenarios while the results and recommendations are compiled by human experts. Bayesian methods elevate this conventional practice from simple atomic statistical analyses to a large composable inference engine. Specifically, Bayesian methods enable the platforms and methods of the present disclosure to dynamically condition the survivability analysis on real-time data and other data, add sources of data in a composable manner, and incorporate prior expert knowledge into a new data-driven solution to increase reliability and robustness in the face of weak data. Such a data-driven solution may also include machine learning or elements thereof in certain implementations.

With the Bayesian framework in mind, the ultimate goal of the survivability analysis performed using this framework is a survival curve. The physical phenomenon described by this curve is that an asset begins its service life at a healthy state, various components of this asset are subject to degradation events occurring with some measure of randomness, and this degradation accumulates over time until the degraded components undergo maintenance or failure. The concept of a state, being subject to degradation and thereby producing a new state, is generally represented by a Markov chain model. A Markov chain model is a model where the next event of the sequence only depends on the current state $(x_t)$ and future, random events (w), represented below:

$$x_{t+1} = f(x_t, w) \qquad (5)$$

Degradation accumulates over time, such that the degradation process fits a random-walk model, which is special case of the Markov chain represented by equation (5). This random-walk model is when the next state is simply the current state plus a random variable, as represented below:

$$x_{t+1} = x_t + w \tag{6}$$

In relation to a survivability analysis, wear rates are excellent examples of a random-walk model. Such a model includes an initial health state (e.g., roughly 100%), and random events (w) cause degradation and slowly reduce the health state until the health state reaches zero. In this model, both the initial health state and the wear rate may be considered random variables. Regardless, the initial assumption generally corresponds to the initial health state being worn down by a noisy wear variable w. This wear variable may always be positive, and because of the random-walk modeling, this wear variable is additive to the initial health state. As a consequence, the wear variable may be conveniently modelled by a gamma distribution, as shown below:

$$w \sim f_w(x) = f_G(x; \alpha, \theta) = \frac{1}{\Gamma(\alpha)\theta^\alpha} x^{\alpha-1} e^{-\frac{x}{\theta}} \tag{7}$$

Generally, equation (7) is a single-tailed distribution with numerous desirable traits. Some of the more important traits of equation (7) include physically meaningful parameters and easy addition of damage types of the same scale. In particular, θ represents how much damage a wear event causes on average, α represents how frequently this 0-level damage happens, and α*θ represents the average wear rate. As an example, consider an automobile where the maximum health of the automobile is represented by 1.0. G(α=100/year, θ=0.0001) may represent frequent events that result in small amounts of damage, such as driving in wet weather. By contrast, G(α=0.2/year, θ=0.5) may be an infrequent event that results in a large amount of damage, such as a collision. Moreover, for damage types of the same scale θ, such as $w_1 \sim G(\alpha_1, \theta)$ and $w_2 \sim G(\alpha_2, \theta)$, then $w_1+w_2=G(\alpha_1+\alpha_2, \theta)$ and a is effectively a damage-tracking parameter over time.

This additive property of the Gamma distribution enables easy modeling of random-walk damage, which is a normal result of successively applying wear variables. For a single transition, the model may be represented as:

$$h_k = h_{k-1} - w_k \tag{8}$$

However, such a model can be arbitrarily projected into the future, as represented below:

$$h_t = h_0 - \sum_{k=1}^{t} w_k, \tag{9}$$

such that, the wear at time t (w e) may have the following distribution $$w_t = \sum_{k=1}^{t} w_k, \tag{10}$$

which may be $\sim f_G(\alpha \cdot t, \theta)$. In other words, the equivalent value of α grows linearly with respect to t. Interestingly, as α grows, the distribution appears more Gaussian, as may be expected from a random-walk model as a consequence of the central limit theorem. Moreover, given that the wear is additive, the probability of survival may be expressed as:

$$P(h_0 - w_t > 0) = P(h_0 \geq w_t), \tag{11}$$

$$= F_G(h_0, \alpha \cdot t, \theta), \tag{12}$$

which, assuming α=1.0, θ=0.2, produces a relatively generic survival curve.

Concerning the health distributions, an asset is generally modelled as having an initial health value $h_0$. Because quality control may not be exact, this initial health value is typically taken as a random variable that follows a distribution $f_h(x)$, where $h_0 \sim f_h(x)$. This distribution may take any form, but for the sake of simplicity, assume that the expected value (i.e., the mean) is equal to 1, such that $E(f_h(x))=1$. Nevertheless, the shape of the initial health distribution for an asset may vary significantly. For example, in a modeling instance involving significant infant mortality, the asset health distribution may be a bimodal distribution, where there is a cluster of health values around a value significantly less than 1, and a mode slightly greater than 1 ensuring that the average value is 1. However, more often than not, $f_h(x)$ is generally expected to be a relatively tight distribution (e.g., almost Gaussian) around 1, with a cutoff near zero.

In the prior survival curve example, the value of $h_0$ was a point estimate, but generally speaking (and particularly when using Bayesian inference) the value of $h_0$ is a distribution. As such, the weighted average of the results (e.g., weighted by each probability of $h_0$) is calculated to find the probability of failure. Accordingly, the survival/reliability curve may generally be represented by the following convolutions:

$$P(h_0 \geq w_t) = \int_{-\infty}^{\infty} P_w(w_t \leq z) \cdot f_{h_0}(z) dz, \tag{13}$$

$$P(h_0 \geq w_t) = \int_{-\infty}^{\infty} F_w(z, t) \cdot f_{h_0}(z) dz, \tag{14}$$

where $F_w(z, t)$ is the cumulative density function (CDF) of $w_t$, which is the CDF of a gamma distribution parameterized by α·t, and given as:

$$F_w(z, t) = \frac{1}{\Gamma(\alpha)} \gamma(\alpha \cdot t, \beta \cdot z), \tag{15}$$

where γ(α·t, β·z) is the lower incomplete gamma function. Combining equations (13)-(15) together results in the following expression for the survival/reliability curve:

$$R(\Delta t) = \int_{-\infty}^{\infty} \frac{1}{\Gamma(\alpha)} \gamma(\alpha \cdot t, \beta \cdot z) \cdot f_{h_0}(z) dz \tag{16}$$

Conventionally, such a failure probability curve represented by equation (16) is fit with a Weibull distribution, but taking such an approach does not enable easily factoring in dynamic observations to tighten these conditional reliability curves. Further, conventional techniques only condition survival curves on observations indicating that the asset has not yet failed, but Bayesian techniques enable dynamic conditioning survival curves on many other pieces of data (e.g., including real-time data) and can form a basis for incorporating machine learning techniques that further enhance the dynamic and efficient predictive capabilities of the Bayesian framework relative to conventional approaches.

II. Example Network Configuration

Turning now to the figures, FIG. 1 depicts an example network configuration 100 in which example embodiments may be implemented. As shown, network configuration 100 includes at its core a central computing system 102, which may be communicatively coupled to one or more data sources 104 and one or more output systems 106 via respective communication paths. In such an arrangement, central computing system 102 may generally serve as an "asset data platform" that is configured to perform functions to facilitate the monitoring, analysis, and/or management of various types of "assets," which may take various forms.

For instance, some representative types of assets that may be monitored by asset data platform 102 may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers, solar panels), petroleum production equipment (e.g., gas compressors, distillation columns, pipelines), and data network nodes (e.g., personal computers, routers, bridges, gateways, switches, etc.), among other examples. Additionally, an asset may have various other characteristics that more specifically define the type of asset, examples of which may include the asset's brand, make, model, vintage, and/or software version, among other possibilities. In this respect, depending on the implementation, the assets monitored by asset data platform 102 may either be of the same type or various different types. Additionally yet, the assets monitored by asset data platform 102 may be arranged into one or more "fleets" of assets, which refers to any group or two or more assets that are related to one another in some manner (regardless of whether such assets are of the same type).

Broadly speaking, asset data platform 102 may comprise one or more computing systems that have been provisioned with software for carrying out one or more of the platform functions disclosed herein, including but not limited to receiving data related to the operation, observation, maintenance, and/or management of assets (broadly referred to herein as "asset-related data") from data sources 104, performing data ingestion and/or data analytics operations on the asset-related data received from asset data sources 104, and then outputting data and/or instructions related to the operation and/or management of assets to output systems 106. The one or more computing systems of asset data platform 102 may take various forms and be arranged in various manners.

For instance, as one possibility, asset data platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates asset data platform 102 may either supply its own cloud infrastructure or may obtain the cloud infrastructure from a third-party provider of "on demand" computing resources, such include Amazon Web Services (AWS), Microsoft Azure, Google Cloud, Alibaba Cloud, or the like. As another possibility, asset data platform 102 may comprise one or more dedicated servers that have been provisioned with software for carrying out one or more of the platform functions disclosed herein. Other implementations of asset data platform 102 are possible as well.

Further, in practice, the software for carrying out the disclosed platform functions may take various forms. As one possibility, the platform software may comprise executable program instructions that cause asset data platform 102 to perform data ingestion operations on asset-related data received from data sources 104, including but not limited to extraction, transformation, and loading operations, among other examples. As another possibility, the platform software may comprise executable program instructions that cause asset data platform 102 to perform data analytics operations based on the asset-related data received from data sources 104, including but not limited to failure/survival prediction, anomaly detection, fuel management, noise filtering, image analysis, predictive recommendations, and data integrity operations, among other examples. As yet another possibility, the platform software may comprise executable program instructions that cause asset data platform 102 to output data and/or instructions related to the operation and/or management of assets for receipt by one or more output systems 106.

As one specific example, the platform software may comprise executable program instructions for outputting data related to the operation and/or management of assets that is to be presented to a user (e.g., asset-related data received from data sources 104 and/or the results of the data analytics operations performed by asset data platform 102), and these program instructions may take the form of discrete "applications" that are each tailored for particular end users, particular groups of assets, and/or particular purposes. Some representative examples of such applications may include (i) an asset survivability application (e.g., comprising a Bayesian risk inference engine (BRIE)), (ii) an asset performance management application, (iii) a service optimization application, or (iv) an asset dealer operations application, among other possible applications.

The software for carrying out the disclosed platform functions may take various other forms as well.

As described above, asset data platform 102 may be configured to receive asset-related data from one or more data sources 104. These data sources—and the asset-related data output by such data sources—may take various forms. To illustrate, FIG. 1 shows some representative examples of data sources 104 that may provide asset-related data to asset data platform 102, which are discussed in further detail below. However, it should be understood that these example data sources are merely provided for purposes of illustration, and that asset data platform 102 may be configured to receive asset-related data from other types of data sources as well.

For instance, one type of data source 104 may take the form of an asset 104A, which may be equipped with components that are configured to capture data that is indicative of the operation of the asset (referenced herein as "operating data" or "real-time data") and then transmit the asset's operating data to asset data platform 102 over the respective communication path between asset 104A and asset data platform 102. In this respect, asset 104A may take any of the various forms described above, including but not limited to a transport vehicle, heavy equipment, manufacturing equipment, electric power generation equipment, and/or petroleum production equipment, among other types of assets. Further, it should be understood that the components of asset 104A for capturing and transmitting the asset's operating data either may be included as part of asset 104A as manufactured or may be affixed to asset 104A at some later date, among other possibilities.

The operating data that is captured and sent by asset 104A may take various forms. As one possibility, an asset's operating data may include sensor data that comprises time-series measurements for certain operating parameters of the asset, examples of which may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others. As another possibility, an asset's operating data may include abnormal-conditions data that indicates occurrences of discrete abnormal conditions at the asset, examples of which include fault codes that indicate the occurrence of certain faults at the asset (e.g., when an operating parameter exceeds a threshold), asset shutdown indicators, and/or other types of abnormal-condition indicators. As yet another possibility, an asset's operating data may include data that has been derived from the asset's sensor data and/or abnormal-conditions data, examples of which may include "roll-up" data (e.g., an average, mean, median, etc. of the raw measurements for an operating parameter over a given time window) and "features" data (e.g., data values that are derived based on the raw measurements of two or more of the asset's operating parameters). An asset's operating data may take various other forms as well.

In practice, an asset's operating data may also include or be associated with data that identifies the origin of the operating data. This origin data may take various forms. For example, such origin data may include identifying information for the originating asset (e.g., an asset ID and/or data indicating the asset's type, brand, make, model, age, software version, etc.) and/or identifying information for the component of asset 104A that captured the operating data (e.g., a sensor ID), among other possibilities. As another example, such origin data may include data indicating the time at which the operating data was captured (e.g., a timestamp) and/or the asset's location when the operating data was captured (e.g., GPS coordinates), to the extent that such location is not otherwise included in the operating data. Asset data platform 102 may receive other types of data from asset 104A as well.

Further, asset data platform 102 may be configured to receive operating data from asset 104A in various manners. As one possibility, asset 104A may be configured to send its operating data to asset data platform 102 in a batch fashion, in which case asset data platform 102 may receive periodic transmissions of operating data from asset 104A (e.g., on an hourly, daily, or weekly basis). As another possibility, asset data platform 102 may receive operating data from asset 104A in a streaming fashion as such operating data is captured by asset 104A. As yet another possibility, asset data platform 102 may receive operating data from asset 104A in response to sending a request for such data to asset 104A, in which case asset data platform 102 may be configured to periodically send requests for operating data to asset 104A. Asset data platform 102 may be configured to receive operating data from asset 104A in other manners as well.

Another type of data source 104 may take the form of operating data source 104B, which may comprise a computing system that is configured to receive operating data from one or more upstream sources of operating data (e.g., assets) and then provide this operating data to asset data platform 102 over the respective communication path between operating data source 104B and asset data platform 102. Such an operating data source may take various forms. As one possibility, operating data source 104B may comprise an existing data platform of a third-party organization that receives and/or maintains operating data for one or more assets, such as a data platform operated by an asset owner, an asset dealer, an asset manufacturer, an asset repair shop, or the like. As another possibility, operating data source 104B may comprise an intermediary system that compiles operating data from a plurality of upstream sources of operating data and then provides that compiled operating data to asset data platform 102. For example, such an intermediary system may take the form of a computing system located in proximity to a fleet of assets (e.g., at a job site or wind farm) that is configured to compile operating data for the fleet of assets or a computing system that is configured to compile operating data maintained by several third-party data platforms, among other possibilities. Operating data source 104B may take other forms as well.

The operating data that is maintained and sent by operating data source 104B may take various forms, including but not limited to any of the forms described above. In addition to the operating data received from the one or more upstream sources, the operating data provided by operating data source 104B may also include additional operating data that is generated by operating data source 104B itself, such as operating data that operating data sources 104B derives based on the operating data received from the one or more upstream sources (e.g., abnormal-conditions data, roll-up data, features data, etc.).

Further, as with asset 104A, asset data platform 102 may be configured to receive operating data from operating data source 104B in various manners. As one possibility, operating data source 104B may be configured to send its operating data to asset data platform 102 in a batch fashion, in which case asset data platform 102 may receive periodic transmissions of operating data from operating data source 104B (e.g., on an hourly, daily, or weekly basis). As another possibility, asset data platform 102 may receive operating data from operating data source 104B in a streaming fashion as such operating data is received and/or otherwise generated by operating data source 104B. As yet another possibility, asset data platform 102 may receive operating data from operating data source 104B in response to sending a request for such data to operating data source 104B, in which case asset data platform 102 may be configured to periodically send requests for operating data to operating data source 104B. As still another possibility, asset data platform 102 may receive operating data from operating data source 104B by accessing an Application Programming Interface (API) that has been made available by operating data source 104B, subscribing to a service provided by operating data source 104B, or the like. Asset data platform 102 may be configured to receive operating data from operating data source 104B in other manners as well.

Yet another type of data source 104 may take the form of an asset maintenance data source 104C, which may comprise a computing system that is configured to generate and/or receive data related to the maintenance of a plurality of assets (referenced herein as "maintenance data") and then send this maintenance data to asset data platform 102 over the respective communication path between asset maintenance data source 104C and asset data platform 102. In this respect, asset maintenance data source 104C may take various forms. As one possibility, asset maintenance data source 104C may comprise an existing data platform of a third-party organization that is interested in monitoring the maintenance of assets, such as an asset owner, asset dealer, asset manufacturer, asset repair shop, or the like. As another possibility, asset maintenance data source 104C may comprise an intermediary system that compiles asset maintenance data from multiple upstream sources (e.g., multiple repair shops) and then provides that compiled maintenance data to asset data platform 102. Asset maintenance data source 104C may take other forms as well.

The asset maintenance data that is maintained and sent by asset maintenance data source 104C may take various forms. As one example, the asset maintenance data may include details regarding inspections, maintenance, servicing, and/or repairs that have been performed or are scheduled to be performed on assets (e.g., work order data). As another example, the asset maintenance data may include details regarding known occurrences of failures at assets (e.g., date of failure occurrence, type of failure occurrence, etc.). Other examples are possible as well. As with the operating data, the asset maintenance data may also include or be associated with data indicating the origins of the asset maintenance data (e.g., source identifier, timestamp, etc.).

Further, asset data platform 102 may be configured to receive operating data from asset maintenance data source 104C in various manners, including but not limited to any of the manners discussed above with respect to operating data source 104B.

Still another type of data source 104 may take the form of environmental data source 104D, which may comprise a computing system that is configured to generate and/or receive data about an environment in which assets operate (referenced herein as "environmental data") and then send this data to asset data platform 102 over the respective communication path between environmental data source 104D and asset data platform 102. In this respect, environmental data source 104D— and the environmental data provided thereby—may take various forms.

As one possibility, environmental data source 104D may take the form of a weather data source that provides information regarding the weather at locations where assets operate (e.g., ambient temperature, air pressure, humidity, wind direction, wind speed, etc.). As another possibility, environmental data source 104D may take the form of a geospatial data source that provides information regarding the geography and/or topology at locations where assets operate. As yet another possibility, environmental data source 104D may take the form of a satellite image data source that provides satellite imagery for locations where assets operate. As still another possibility, environmental data source 104D may take the form of a traffic data source that provides information regarding ground, air, and/or water traffic at locations where assets operate. Environmental data source 104D may take other forms as well.

Further, in practice, asset data platform 102 may be configured to receive operating data from asset environmental data source 104D in various manners, including but not limited to any of the manners discussed above with respect to operating data source 104B.

Another type of data source 104 may take the form of client station 104E, which may comprise any computing device that is configured to receive user input related to the operation and/or management of assets (e.g., information entered by a fleet operator, a repair technician, or the like) and then send that user input to asset data platform 102 over the respective communication path between client station 104E and asset data platform 102. In this respect, client station 104E may take any of various forms, examples of which may include a desktop computer, a laptop, a netbook, a tablet, a smartphone, and/or a personal digital assistant (PDA), among other possibilities.

The user input that is entered into client station 104E and sent to asset data platform 102 may comprise various different kinds of information, including but not limited to the kinds of information discussed above with respect to the other data sources. For instance, as one possibility, the user input may include certain kinds of operating data, maintenance data, and/or environmental data that may be input into asset data platform 102 by a user rather than being received from one of the aforementioned data sources. As another possibility, the user input may include certain user-defined settings or logic that is to be used by asset data platform 102 when performing data ingestion and/or data analytics operations. The user input that is entered into client station 104E and sent to asset data platform 102 may take various other forms as well.

The aforementioned data sources 104 are merely provided for purposes of illustration, and it should be understood that the asset data platform's data sources may take various other forms as well. For instance, some or all of the forgoing types of data described above with respect to the various data sources 104A-E may ultimately be provided to the asset data platform in the form of physical media. In this example, a user may provide to an operator of asset data platform 102 one or more non-volatile storage mediums, such as read-only memory, a hard-disk drive, a solid-state drive, flash memory, an optical-storage device, etc., whereupon an operator of asset data platform 102 may load this data into the asset data platform 102. Additionally, while FIG. 1 shows several different types of data sources 104, it should be understood that asset data platform 102 need not be configured to receive asset-related data from all of these different types of data sources, and in fact, asset data platform 102 could be configured to receive asset-related data from as little as a single data source 104. Further, while data sources 104A-E have been shown and described separately, it should be understood that these data sources may be combined together as part of the same physical computing system (e.g., an organization's existing data platform may serve as both operating data source 104B and maintenance data source 104C). Further yet, it should be understood that asset data platform 102 may be configured to receive other types of data related to the operation and/or management of assets as well, examples of which may include asset management data (e.g., route schedules and/or operational plans), enterprise data (e.g., point-of-sale (POS) data, customer relationship management (CRM) data, enterprise resource planning (ERP) data, etc.), and/or financial markets data, among other possibilities.

As shown in FIG. 1, asset data platform 102 may also be configured to output asset-related data and/or instructions for receipt by one or more output systems 106. These output systems—and the data and/or instructions provided to such output systems—may take various forms. To illustrate, FIG. 1 shows some representative examples of output systems 106 that may receive asset-related data and/or instructions from asset data platform 102, which are discussed in further detail below. However, it should be understood that these example output systems are merely provided for purposes of illustration, and that asset data platform 102 may be configured to output asset-related data and/or instructions to other types of output systems as well.

For instance, one type of output system 106 may take the form of client station 106A, which may comprise any computing device that is configured to receive asset-related data from asset data platform 102 over the respective communication path between client station 106A and asset data platform 102 and then present such data to a user (e.g., via an application that is defined by asset data platform 102). In this respect, client station 106A may take any of various forms, examples of which may include a desktop computer, a laptop, a netbook, a tablet, a smartphone, and/or a PDA, among other possibilities. Further, it should be understood that client station 106A could either be a different device than client station 104E or could be the same device as client station 104E.

The asset-related data that is output for receipt by client station 106A may take various forms. As one example, this asset-related data may include a restructured version of asset-related data that was received by asset data platform 102 from one or more data sources 104 (e.g., operating data, maintenance data, etc.). As another example, this asset-related data may include data that is generated by asset data platform 102 based on the asset-related data received from data sources 104, such as data resulting from the data analytics operations performed by asset data platform 102 (e.g., health distributions and survival curves for assets, predicted failures, recommendations, alerts, etc.). As yet another example, data that is output for receipt by client station 106A may include platform configuration data, examples of which may include data that describes how the asset data platform is configured, data that describes the various data sources 104, and data that describes the various output systems 106. Other examples are possible as well.

Along with the asset-related data that is output for receipt by client station 106A, asset data platform 102 may also output associated data and/or instructions that define the visual appearance of an application (e.g., a graphical user interface (GUI)) through which the asset-related data is to be presented on client station 106A. Such data and/or instructions for defining the visual appearance of an application may take various forms, examples of which may include Hypertext Markup Language (HTML), Cascading Style Sheets (CSS), and/or JavaScript, among other possibilities. However, depending on the circumstance, it is also possible that asset data platform 102 may output asset-related data to client station 106A without any associated data and/or instructions for defining the visual appearance of an application.

Further, client station 106A may receive asset-related data from asset data platform 102 in various manners. As one possibility, client station 106A may send a request to asset data platform 102 for certain asset-related data and/or a certain application, and client station 106A may then receive asset-related data in response to such a request. As another possibility, asset data platform 102 may be configured to "push" certain types of asset-related data to client station 106A, such as scheduled or event-based alerts, in which case client station 106A may receive asset-related data from asset data platform 102 in this manner. As yet another possibility, asset data platform 102 may be configured to make certain types of asset-related data available via an API, a service, or the like, in which case client station 106A may receive asset-related data from asset data platform 102 by accessing such an API or subscribing to such a service. Client station 106A may receive asset-related data from asset data platform 102 in other manners as well.

Another type of output system 106 may take the form of a data platform 106B operated by a third-party organization that may be interested in the operation and/or management of assets, such as an asset owner, an asset dealer, an asset manufacturer, an asset repair shop, or the like. For instance, a third-party organization such as this may have its own data platform 106B that already enables users to access and/or interact with asset-related data through applications that have been created by the third-party organization, but data platform 106B may not be programmed with the capability to ingest certain types of asset-related data or perform certain types of data analytics operations (and/or data platform 106B may have the capability to perform such operations but it may nevertheless be undesirable for data platform 106B to do so). In such a scenario, asset data platform 102 may be configured to output certain asset-related data for receipt by data platform 106B.

The asset-related data that is output for receipt by data platform 106B may take various forms, including but not limited any of the forms described above in connection with the output to client station 106A. However, unlike for client station 104A, the asset-related data that is output for receipt by data platform 106B typically need not include any associated data and/or instructions for defining the visual appearance of an application, because data platform 106B may be performing operations on the asset-related data from asset data platform 102 beyond presenting it to a user via an application.

Further, data platform 106B may receive asset-related data from asset data platform 102 in various manners, including but not limited to any of the manners discussed above with respect to client station 106A (e.g., by sending a request to asset data platform 102, having data "pushed" by asset data platform, or accessing an API or service provided by asset data platform 102).

Yet another type of output system 106 may take the form of asset 106C, which may be equipped with components that are configured to receive asset-related data and/or instructions from asset data platform 102 and then act in accordance with the received data and/or instructions. In this respect, asset 106C may take any of the various forms described above, including but not limited to a transport vehicle, heavy equipment, manufacturing equipment, electric power generation equipment, and/or petroleum production equipment, among other types of assets. Further, it should be understood that asset 106C could either be a different asset than asset 104A or could be the same asset as asset 104A.

The asset-related data and/or instructions that are output for receipt by asset 106C may take various forms. As one example, asset data platform 102 may be configured to send asset 106C certain data that has been generated by asset data platform 102 based on the asset-related data received from data sources 104, such as data resulting from a data analytics operation performed by asset data platform 102 (e.g., health distributions and survival curves for assets, predicted failures, recommendations, alerts, etc.), in which case asset 106C may receive this data and then potentially adjust its operation in some way based on the received data. As another example, asset data platform 102 may be configured to generate and send an instruction for asset 106C to adjust its operation in some way (e.g., based on the asset-related data received from data sources 104), in which case asset 106C may receive this instruction and then potentially adjust its operation in accordance with the instruction. As yet another example, asset data platform 102 may be configured to generate and send an instruction for asset 106C to perform a data analytics operation locally at asset 106C, in which case asset 106C may receive the instruction and then locally perform the data analytics operation. In some cases, in conjunction with sending asset 106C an instruction to perform a data analytics operation, asset data platform 102 may also provide asset 106C with executable program instructions and/or program data that enable asset 106C to perform the data analytics operation (e.g., a predictive model). However, in other cases, asset 106C may already be provisioned with executable program instructions for performing the data analytics operation. Other examples are possible as well.

Further, in practice, asset 106C may receive asset-related data and/or instructions from asset data platform 102 in various manners, including but not limited to any of the manners discussed above with respect to client station 106A.

Still another type of output system 106 may take the form of work-order system 106D, which may comprise a computing system that is configured to receive asset-related data and/or instructions from asset data platform 102 over the respective communication path between work-order system 106D and asset data platform 102 and then generate a work order in accordance with the received data and/or instructions.

A further type of output system 106 may take the form of parts-ordering system 106E, which may comprise a computing system that is configured to receive asset-related data and/or instructions from asset data platform 102 over the respective communication path between parts-ordering system 106E and asset data platform 102 and then generate a parts order in accordance with the received data and/or instructions.

The aforementioned output systems 106 are merely provided for purposes of illustration, and it should be understood that output systems in communication with asset data platform 102 may take various other forms as well. For instance, while FIG. 1 shows several different types of output systems 106, it should be understood that asset data platform 102 need not be configured to output asset-related data and/or instructions for receipt by all of these different types of output systems, and in fact, asset data platform 102 could be configured to asset-related data and/or instructions for receipt by as little as a single output system 106. Further, while output systems 106A-E have been shown and described separately, it should be understood that these output systems may be combined together as part of the same physical computing system. Further yet, it should be understood that asset data platform 102 may be configured to output asset-related data and/or instructions for receipt by other types of output systems as well.

As discussed above, asset data platform 102 may communicate with the one or more data sources 104 and one or more output systems 106 over respective communication paths. Each of these communication paths may generally comprise one or more communication networks and/or communications links, which may take any of various forms. For instance, each respective communication path with asset data platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with asset data platform 102 may be wireless, wired, or some combination thereof, and may carry data according to any of various different communication protocols. Moreover, in some embodiments, the respective communication paths with asset data platform 102 may represent transfers of data to or from one or more non-volatile storage mediums, such as read-only memory, a hard-disk drive, a solid-state drive, flash memory, an optical-storage device, etc.

Although not shown, the respective communication paths with asset data platform 102 may also include one or more intermediate systems. For example, it is possible that a given data source 104 may send asset-related data to one or more intermediary systems, such as an aggregation system, and asset data platform 102 may then be configured to receive the asset-related data from the one or more intermediary systems. As another example, it is possible that asset data platform 102 may communicate with a given output system 106 via one or more intermediary systems, such as a host server (not shown). Many other configurations are also possible.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

III. Example Asset Data Platform

Figure 2A:
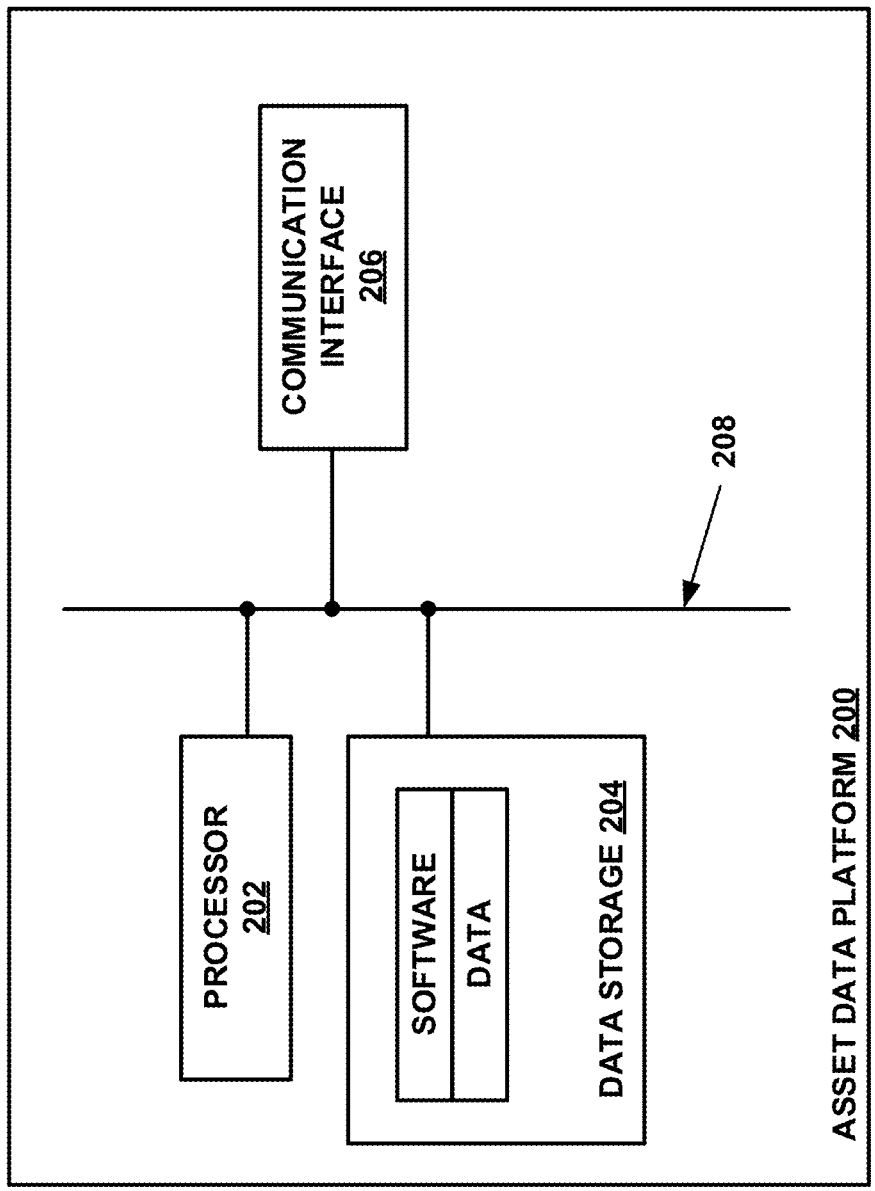
FIG. 2A depicts a simplified block diagram of an example asset data platform from a structural perspective.

Turning now to FIG. 2A, this figure is a simplified block diagram illustrating some structural components that may be included in an example asset data platform 200, which could serve as asset data platform 102 in FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 2A, data storage 204 may be provisioned with software components that enable platform 200 to carry out the functions disclosed herein. These software components may generally take the form of program instructions that are executable by the processor 202 to carry out the disclosed functions, which may be arranged together into software applications, microservices, virtual machines, software development kits, toolsets, or the like.

Further, data storage 204 may be arranged to store asset-related data in one or more databases, file systems, or the like. For example, data storage 204 may be configured to store data using technologies such as Apache Cassandra, Apache Hadoop, Apache Kafka, PostgreSQL, MongoDB, and/or Cloud Native Object Storage technologies (e.g., S3 or Azure Blob), among other possibilities. Data storage 204 may take other forms and/or store data in other manners as well.

Communication interface 206 may be configured to facilitate wireless and/or wired communication with data sources and output systems, such as data sources 104 and output systems 106 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

Figure 2B:
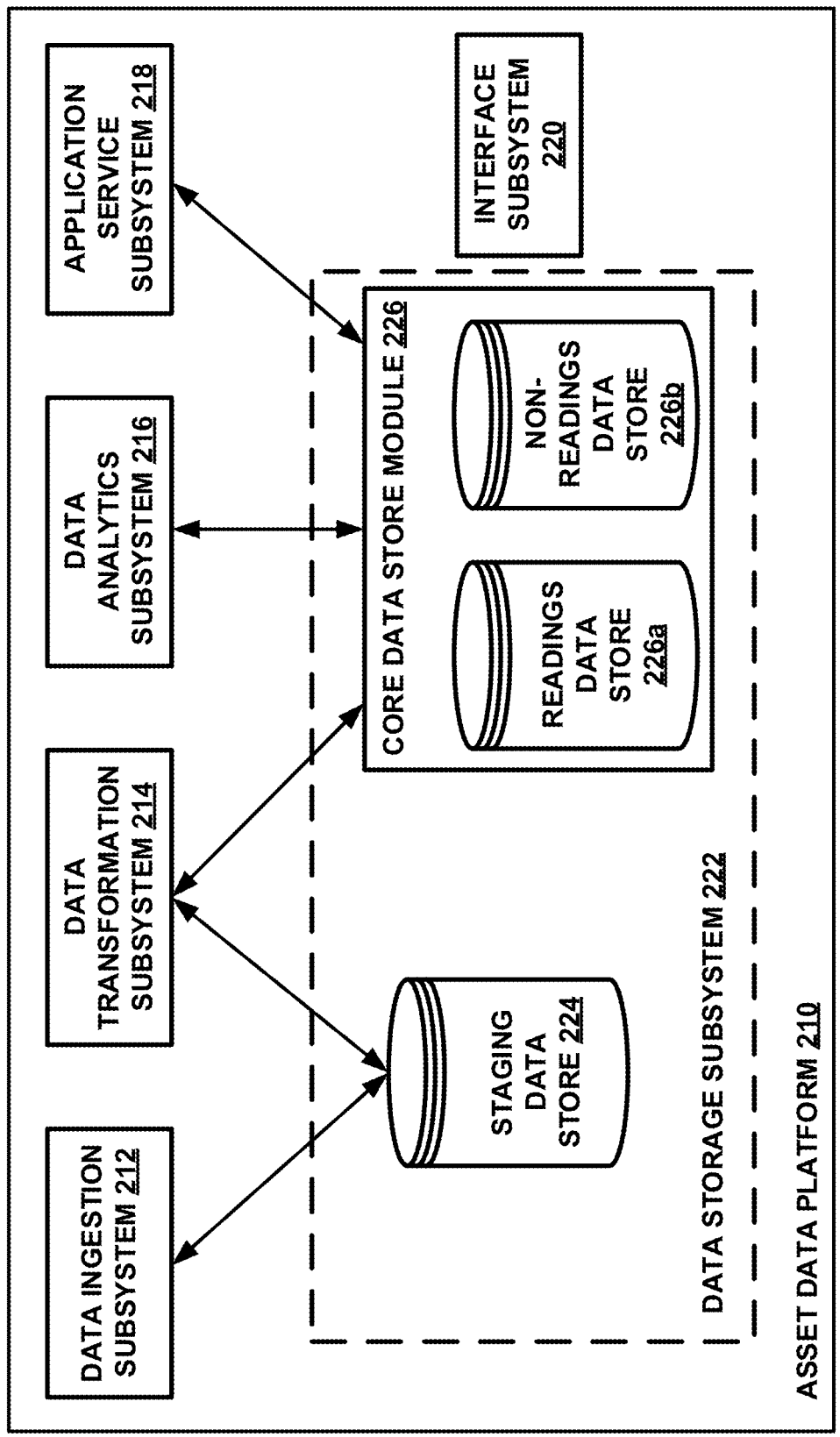
FIG. 2B depicts a simplified block diagram of an example asset data platform from a functional perspective.

Turning now to FIG. 2B, another simplified block diagram is provided to illustrate an example functional architecture of an example asset data platform 210, which could serve as asset data platform 102 in FIG. 1. As shown, the example platform 210 may include a data ingestion subsystem 212, a data transformation subsystem 214, a data analytics subsystem 216, an application service subsystem 218, an interface subsystem 220, and a data storage subsystem 222, each of which comprises a combination of software and hardware elements that are configured to carry out particular functions. In line with the discussion above, the hardware elements that are utilized to implement these functional subsystems may comprise hardware elements of one or more computing systems, which may take the form of computing infrastructure of a public, private, and/or hybrid cloud or one or more dedicated servers, among other possibilities. Further, in practice, these functional subsystems may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

At a high level, data ingestion subsystem 212 may function to ingest asset-related data from one or more data sources (e.g., one or more data sources 104) so that the data can be passed to the other platform modules. To do this, data ingestion subsystem 212 may be configured to connect to and ingest asset-related data from these one or more data sources using any technique now known or later developed.

In one implementation, data ingestion subsystem 212 may be configured to utilize "connections" to facilitate ingesting asset-related data from multiple different types of data sources, where each such data source may provide data in proprietary formats and may involve different protocols for accessing the asset-related data. Generally, a connection is a data structure that describes how data ingestion subsystem 212 connects to and ingests asset-related data from a particular data source. For instance, a connection designed to connect to a particular data source may specify, among other possibilities, (i) what type of "connector" the connection uses and the configuration data of that connector, (ii) the location of the data source (e.g., a web address, IP address, or other network location identifier), (iii) the format of the data available at the data source (e.g., a comma-separated values format or a proprietary data format), (iv) the type of data that will be received from the data source, (v) an identification of which data from the data source will be ingested into asset data platform 210 through the connection, (vi) how often the data will be ingested (e.g., on a real-time basis, or a batch upload basis), and/or (vii) any credentials or other authenticating information that may be necessary for accessing the data source (e.g., username/password, pre-shared keys, etc.). Advantageously, configuration data for the connector used by a given connection will generally be tightly integrated with the security and authorization mechanisms of the Platform. This may help to ensure the data ingested by asset data platform 210 is properly entitled and available only to such personnel who have been authorized to access it. Additionally, the mechanisms for creating platform connectors may enable the integration of third-party tooling as well as the use of custom client connectors during solution engineering.

In practice, data ingestion subsystem 212 may utilize one connection per data source from which data ingestion subsystem 212 will ingest data. In the example arrangement depicted in FIG. 1, if it is desired that the platform ingest asset-related data from each data source 104A-E, then data ingestion subsystem 212 may utilize one connection for each data source 104. In some situations, however, data ingestion subsystem 212 may utilize more than one connection per data source from which data ingestion subsystem 212 will ingest data. Data ingestion subsystem 212 may do this, for instance, when it will ingest some data from a data source in one way (real-time processing) and other data from the data source in another way (e.g., batched processing).

Data ingestion subsystem 212 may be configured to connect to and ingest asset-related data from the one or more data sources in various other manners as well.

Further, data ingestion subsystem 212 may ingest various types of asset-related data. For instance, as one possibility, data ingestion subsystem 212 may ingest what are called "readings" data and "non-readings" data.

As a general matter, readings data may refer to asset-related data that is collected on a "high-volume" basis. For instance, readings data may include time-series data that is ingested from data channels that provide data readings at a rate of hundreds, thousands, tens of thousands, or even hundreds of thousands of times per second. For some data sources, data ingestion subsystem 212 may be configured to ingest readings data from these data sources as soon as the readings data is collected by the data source. As such, the readings data that is ingested into asset data platform 210 from such data sources may be considered to be ingested on a real-time or near real-time basis and may be referred to as "instantaneous" readings data. For other data sources, data ingestion subsystem 212 may be configured to ingest readings data once a threshold amount of such readings data has been collected at the data source or once the readings data has been collected for a threshold amount of time, among other possibilities. As such, readings data that is ingested into asset data platform 210 from such data sources may be considered to be ingested on a batched basis and may be referred to as "staged readings" data.

In turn, non-readings data may refer to asset-related data that is collected aperiodically (such as fault-code data channels, work-order data channels, repair activity data channels, etc.) or data that is collected periodically but may not rise to the level of what may constitute "high-volume" data (such as data that may be ingested from data channels that provide data readings on a per minute or per hour basis). The asset-related data that is ingested by data ingestion subsystem 212 may take various other forms as well.

Once asset-related data is ingested by data ingestion subsystem 212, it is stored in data storage subsystem 222 and made available to the data transformation module. For instance, the ingested asset-related data may be stored within one or more "staging" data stores of data storage subsystem 222 that are configured to store the raw data ingested into asset data platform 210 by data ingestion subsystem 212 prior to this data being retrieved by data transformation subsystem 214, transformed, then persistently stored in one or more other data stores of data storage subsystem 222.

Data transformation subsystem 214 may be configured to retrieve ingested asset-related data from a staging data store 224, perform one or more transformation on the asset-related data (which may sometimes also be referred to as data preparation and/or data integration operations), and store the data in an appropriate location within the platform's data storage subsystem 222. In this respect, the data transformation operations that are applied by data transformation subsystem 214 may take any of various forms, representative examples of which may include validation, cleansing, deduplication, filtering, aggregation, summarization, enrichment, restructuring, reformatting, translation, mapping, etc.

In one implementation, data transformation subsystem 214 may carry out these operations by utilizing what are called "pipelines." As a general matter, a pipeline is a data structure that generally describes where data is coming from, where data will be stored in data storage subsystem 222, and what, if any, transformations to apply to this data before storing it in data storage subsystem 222. In this respect, a pipeline may generally have three components: (i) a source component that identifies the location in staging data store 224 at which a given set of asset-related data set is stored; (ii) an optional transformation component that identifies a set of one or more transformation operations that are to be applied to some or all of the given set of asset-related data before it is stored in data storage subsystem 222; and (iii) a sink component that identifies the location in data storage subsystem 222 at which the given set of asset-related data will be stored. In this way, a pipeline may function to move a given set of asset-related data from staging data store 224 to data storage subsystem 222 and to transform this data into a format that may be expected by the other modules in the platform (e.g., data analytics subsystem 216 and application service subsystem 218, among others).

Data transformation subsystem 214 may be configured to perform data transformation operations on the ingested asset-related data in various other manners as well.

Data analytics subsystem 216 may generally be configured to perform functions that facilitate evaluation of the ingested (and optionally transformed) asset-related data using data analytics operations, which may enable the data analytics subsystem 216 to derive insights from the asset-related data. In this respect, the data analytics operations carried out by the data analytics subsystem 102d may be embodied in any of various forms.

As one possibility, a data analytics operation may be embodied in the form of a user-defined rule (or set of rules) that is applied to a particular subset of the ingested (and optionally transformed) asset-related data in order to derive insights from that asset-related data.

As another possibility, a data analytics operation may be embodied in the form of a data science model that is applied to a particular subset of the ingested (and optionally transformed) asset-related data in order to derive insights from that asset-related data. In practice, such a data science model may comprise a machine learning model that has been created by applying one or more machine learning techniques to a set of training data, examples of which may include regression, random forest, support vector machines (SVM), artificial neural networks, Naïve Bayes, decision trees, dimensionality reduction, k-nearest neighbor (kNN), gradient boosting, clustering, and association, but data science models for performing data analytics operations could take other forms and be created in other manners as well. The data analytics operations carried out by the data analytics subsystem 216 may be embodied in other forms as well.

Further details regarding some example types of data science models that may be created and/or deployed by the data analytics subsystem 216 are set forth in U.S. patent application Ser. No. 16/663,528, which is incorporated herein by reference in its entirety.

After the data analytics subsystem 216 has created a new data science model, the asset data platform 210 may store a representation of that data science model in data storage subsystem 222. Thereafter, the data science model can be deployed by data analytics subsystem 216.

In addition to data science models that are created by data analytics subsystem 216 in the manner described above, asset data platform 210 may also have the capability to deploy other data science models as well. For instance, as one possibility, asset data platform 210 may be pre-provisioned with one or more data science models that are stored in data storage subsystem 222, such as data science models that have previously been created by the platform provider based on other training data that is available to the platform provider, in which case data analytics subsystem 216 may be capable of deploying one or more of these pre-provisioned data science models. (It should be understood that the platform provider may also periodically update asset data platform 210 with additional pre-provisioned data science models as well.) As another possibility, asset data platform 210 may provide an interface for importing "custom" data science models that have been previously created outside of asset data platform 210, in which case data analytics subsystem 216 may be capable of deploying one or more of these custom data science models. Data analytics subsystem 216 may be capable of deploying data science models that originate in other manners as well.

Referring again to the functionality of data analytics subsystem 216, the operation of deploying a data science model may be carried out in various manners. According to one implementation, the operation of deploying a data science model may begin with an initial sequence of configuration functions, which may include (i) creating a new instance of a data science engine (DSE), which is a particular type of platform service that is designed to execute data science models, (ii) configuring the DSE to execute a particular data science model (e.g., an event prediction model, an anomaly detection model, etc.), and (iii) establishing one or more pipelines that are configured to transfer data that has been ingested for the model's one or more input data channels from data storage subsystem 222 to the DSE. Thereafter, the DSE may begin executing the data science model based on data that is provided to the DSE via the one or more pipelines and outputting the results of the data science model, which may be stored in data storage subsystem 222.

Referring once more to the functionality of data analytics subsystem 216, while a DSE is executing a data science model and producing model outputs, data analytics subsystem 216 may also derive insights based on results produced by the model. In line with the discussion above, these insights may take various forms, which may depend in part on the type of data science model being executed. Further, in line with the discussion above, the function of deriving insights based on results produced by the model may generally involve (i) evaluating whether each result produced by the model satisfies certain threshold criteria associated with an insight of a given type and (ii) if the threshold criteria is met, creating and storing an object that represents the insight in data storage subsystem 222. However, the function of deriving insights based on results produced by a data science model may take other forms as well.

Data analytics subsystem 216 may also be configured to perform various other functions that facilitate evaluation of asset-related data using data analytics operations.

Application service subsystem 218 may be configured to create and drive applications that make use of asset-related data ingested into asset data platform 210 via data ingestion subsystem 212 and/or insights generated by asset data platform 210 based on such asset-related data. An application may generally be a software module that is configured to present asset-related data, insights, or the like to a user in various forms and/or take an action responsive to detecting some trigger or other threshold associated with the platform data. An application may also be configured to receive user input, such as user requests and/or user data. Applications may perform other functions as well. Examples of applications may include an asset performance management application, a service optimization application, and/or an asset dealer operations application, among other possibilities.

Application service subsystem 218 may engage in various functionality that facilitates the execution of applications. For instance, in one implementation, application service subsystem 218 may function as a runtime environment for the applications that are available to tenants of asset data platform 210. In this way, application service subsystem 218, in the context of executing an application, may (i) retrieve from the core data storage module 226 a set of platform configuration data that may take the form of application instructions that define the configuration, visual appearance, and/or functionality of an application, (ii) retrieve from the core data storage module 226 certain data called for by the application instructions, such as asset-related data, insights, or the like, and (iii) operate as a renderer by providing some or all of the retrieved data as well as other instructions to a client device (e.g., client station 106A) or other rendering device that defines the visual appearance of the application and/or how the application presents the retrieved data to a user. Application service subsystem 218 may perform various other functions as well.

Interface subsystem 220 of the example asset data platform 210 may generally be configured to make the platform's functional modules accessible to external computing devices. Interface subsystem 220 may do this by providing various APIs, services, or the like, whereby accessing such an API or subscribing to such a service external computing devices may connect to the platform, receive asset-related data and/or insights from asset data platform 210, and/or provide data to asset data platform 210. As examples, asset data platform 210 may be configured to utilize interface subsystem 220 to output asset-related data and/or instructions for receipt by other output modules, such as third-party data platforms, assets, work-order systems, parts-ordering systems, or the like. External computing devices may receive asset-related data and/or insights from asset data platform 210 in other manners as well.

Data storage subsystem 222 may be configured to persistently store all of the different types of data for asset data platform 210, including asset-related data, model results and insights, alerts, and platform configuration data. In practice, this data storage subsystem 222 may comprise multiple different data stores that are configured to store different data sets, and these different data storages could take any of various forms, examples of which may include relational databases (e.g., Online Transactional Processing (OLTP) databases) such as PostgreSQL databases, NoSQL databases (e.g., columnar databases, document databases, key-value databases, graph databases, etc.,) such as Apache Cassandra and/or MongoDB databases, file-based data stores such as Apchache Hadoop Distributed File System, object-based data stores such as Amazon S3 and/or Azure Blob data stores, data warehouses (which could be based on one or more of the foregoing types of data stores), data lakes (which could be based on one or more of the foregoing types of data stores), and/or message queues (e.g., Apache Kafka), among other possibilities.

For instance, in one implementation, data storage subsystem 222 may comprise (i) a first set of one or more "staging" data stores for storing raw data that is ingested by data ingestion subsystem 212 and (ii) a second set of one or more "core" data stores for storing asset-related data that has been transformed by data transformation subsystem 214, model results and insights that have been derived by data analytics subsystem 216, and/or other data that is generated by asset data platform 210 (perhaps including configuration data for asset data platform 210). Further, the second set of one or more "core" data stores may in turn comprise different subsets of data stores for storing different categories of data, such one subset of data stores that are configured to store readings data and another subset of data stores that are configured to store non-readings data. In this respect, different data store technologies may be utilized for these different categories of data, which may allow for better write and/or read performance. In an example, the core data storage module 226 includes a "readings" data store 226a and a "non-readings" data store 226b. The data stores 226a-b may be configured to store different types of data. As one example, high-volume time-series data readings (such as either instantaneous readings data or staged readings data) may be stored in a "readings" data store 226a that may be specially optimized for high-frequency write operations. On the other hand, low-volume, time-series data or other aperiodic asset-related data may be stored in a "non-readings" data store 226b that may be optimized for other purposes, such as ad-hoc querying or fast-read operations. Other examples are possible as well.

Further details regarding the functional architecture of asset data platform 210 that is shown and described above with reference to FIG. 2B can be found in U.S. patent application Ser. No. 16/633,528, entitled "Data Science Platform" and filed on Oct. 25, 2019, which is incorporated herein by reference in its entirety.

It should also be understood that the functional architecture of asset data platform 210 that is shown and described above with reference to FIG. 2B is merely being presented for purposes of illustration and explanation, and that an asset data platform may have various other functional architectures as well.

IV. Example Asset

As discussed above with reference to FIG. 1 and as will be discussed below in more detail with respect to FIG. 2C, asset data platform 102 may be configured to perform functions to facilitate the monitoring, analysis, and/or management of various types of assets, examples of which may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples.

Broadly speaking, an asset may comprise a combination of one or more electrical, mechanical, electromechanical, and/or electronic components that are designed to perform one or more tasks. Depending on the type of asset, such components may take various forms. For instance, a transport vehicle may include an engine, a transmission, a drivetrain, a fuel system, a battery system, an exhaust system, a braking system, a generator, a gear box, a rotor, and/or hydraulic systems, which work together to carry out the tasks of a transport vehicle. However, other types of assets may include other various other types of components.

In addition to the aforementioned components, an asset may also be equipped with a set of on-board components that enable the asset to capture and report operating data. To illustrate, FIG. 2C is simplified block diagram showing some on-board components for capturing and reporting operating data that may be included within or otherwise affixed to an example asset 230. As shown, these on-board components may include sensors 231, a processor 232, data storage 233, a communication interface 234, and perhaps also a local analytics device 235, all of which may be communicatively coupled by a communication link 236 that may take the form of a system bus, a network, or other connection mechanism.

In general, sensors 231 may each be configured to measure the value of a respective operating parameter of asset 230 and then output data that indicates the measured value of the respective operating parameter over time. In this respect, the operating parameters of asset 230 that are measured by sensors 231 may vary depending on the type of asset, but some representative examples may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others.

In practice, sensors 231 may each be configured to measure the value of a respective operating parameter continuously, periodically (e.g., based on a sampling frequency), and/or in response to some triggering event. In this respect, each sensor 231 may have a respective set of operating parameters that defines how the sensor performs its measurements, which may differ on a sensor-by-sensor basis (e.g., some sensors may sample based on a first frequency, while other sensors sample based on a second, different frequency). Similarly, sensors 231 may each be configured to output data that indicates the measured value of its respective operating parameter continuously, periodically (e.g., based on a sampling frequency), and/or in response to some triggering event.

Based on the foregoing, it will be appreciated that sensors 231 may take various different forms depending on the type of asset, the type of operating parameter being measured, etc. For instance, in some cases, a sensor 231 may take the form of a general-purpose sensing device that has been programmed to measure a particular type of operating parameter. In other cases, a sensor 231 may take the form of a special-purpose sensing device that has been specifically designed to measure a particular type of operating parameter (e.g., a temperature sensor, a GPS receiver, etc.). In still other cases, a sensor 231 may take the form of a special-purpose device that is not primarily designed to operate as a sensor but nevertheless has the capability to measure the value of an operating parameter as well (e.g., an actuator). In still other cases, a sensor 231 may take the form of logic or other program code for producing error codes, where such logic or other program code may or may not be also coupled to or integrated with of any of the foregoing types of sensing devices. Sensors 231 may take other forms as well.

Processor 232 may comprise one or more processor components, such as general-purpose processors, special-purpose processors, programmable logic devices, controllers, and/or any other processor components now known or later developed. In turn, data storage 233 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

Figure 2C:
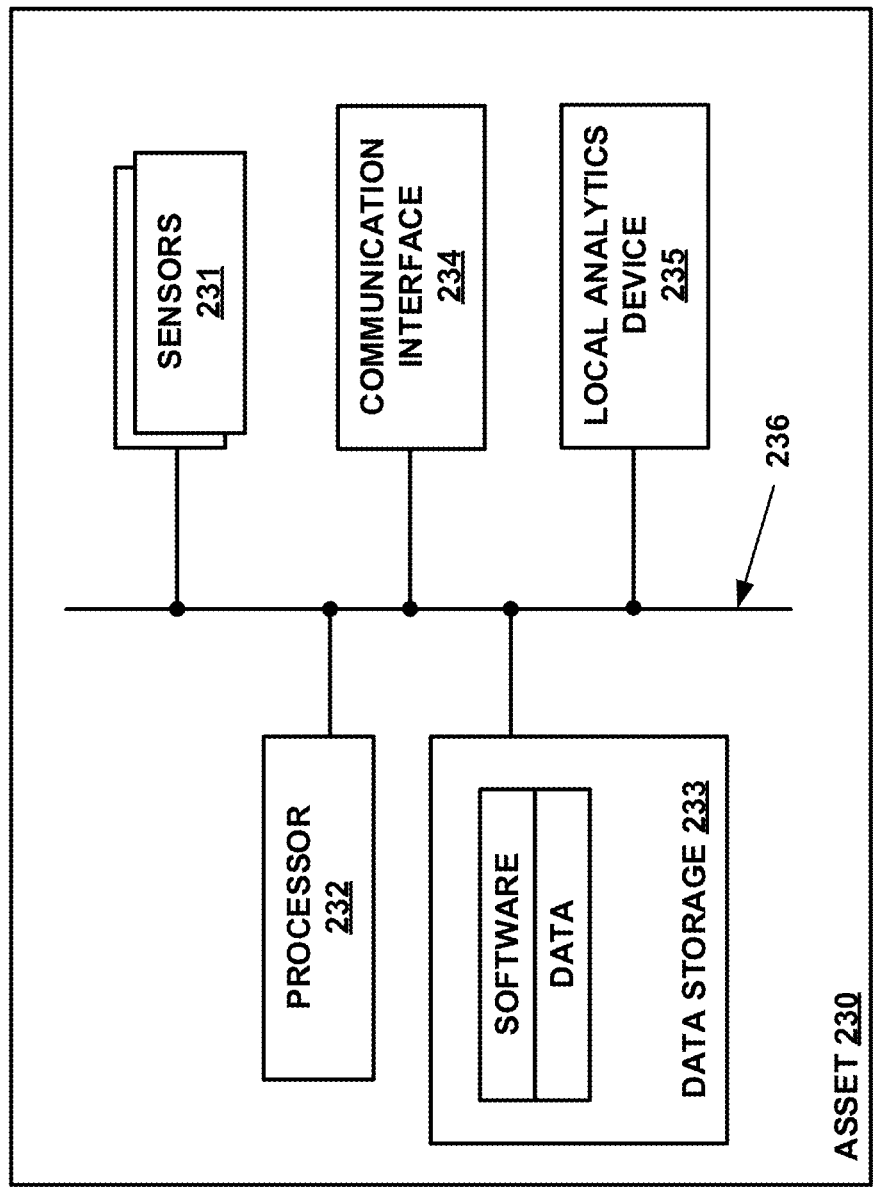
FIG. 2C depicts a simplified block diagram of the on-board components of an example asset.

As shown in FIG. 2C, data storage 233 may be arranged to contain executable program instructions (i.e., software) that cause asset 230 to perform various functions related to capturing and reporting operating data, along with associated data that enables asset 230 to perform these operations. For example, data storage 233 may contain executable program instructions that cause asset 230 to obtain sensor data from sensors 231 and then transmit that sensor data to another computing system (e.g., asset data platform 102). As another example, data storage 233 may contain executable program instructions that cause asset 230 to evaluate whether the sensor data output by sensors 231 is indicative of any abnormal conditions at asset 230 (e.g., by applying logic such as threshold-based rules to the measured values output by sensors 231), and then if so, to generate abnormal-condition data that indicates occurrences of abnormal conditions. The executable program instructions and associated data stored in data storage 233 may take various other forms as well.

Communication interface 234 may be configured to facilitate wireless and/or wired communication between asset 230 and various computing systems, including an asset data platform such as asset data platform 102. As such, communication interface 234 may take any suitable form for carrying out these functions, examples of which may include a chipset and antenna adapted to facilitate wireless communication, an Ethernet interface, a serial bus interface (e.g., Firewire, USB 2.0, on-board diagnostics (OBD), etc.), and/or any other interface that provides for wireless and/or wired communication. Communication interface 234 may also include multiple communication interfaces of different types. Other configurations are possible as well. It should also be understood that asset 230 may not be equipped with its own on-board communication interface.

In some circumstances, it may also be desirable to perform certain data analytics operations locally at asset 230, rather than relying on a central platform to perform data analytics operations. Indeed, performing data analytics operations locally at asset 230 may reduce the need to transmit operating data to a centralized platform, which may reduce the cost and/or delay associated with performing data analytics operations at the central platform and potentially also increase the accuracy of certain data analytics operations, among other advantages.

In this respect, in some cases, the aforementioned on-board components of asset 230 (e.g., processor 232 and data storage 233) may provide sufficient computing power to locally perform data analytics operations at asset 230, in which case data storage 233 may be provisioned with executable program instructions and associated program data for performing the data analytics operations. However, in other cases, the aforementioned on-board components of asset 230 (e.g., processor 232 and/or data storage 233) may not provide sufficient computing power to locally perform certain data analytics operations at asset 230. In such cases, asset 230 may also optionally be equipped with local analytics device 235, which may comprise a computing device that is capable of performing data analytics operations and other complex operations that go beyond the capabilities of the asset's other on-board components. In this way, local analytics device 235 may generally serve to expand the on-board capabilities of asset 230.

Figure 2D:
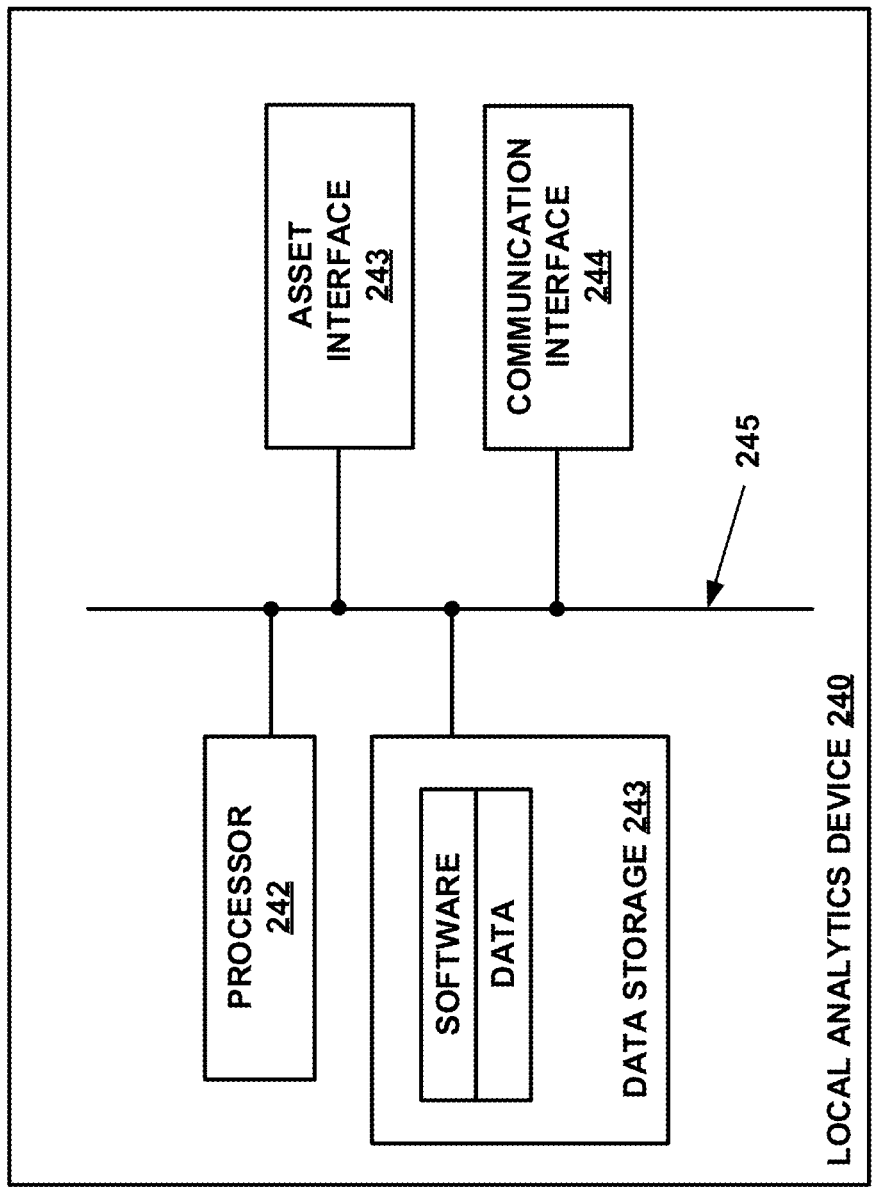
FIG. 2D depicts a simplified block diagram of an example local analytics device.

FIG. 2D illustrates a simplified block diagram showing some components that may be included in an example local analytics device 240. As shown, local analytics device 240 may include an asset interface 243, a processor 242, data storage 243, and a communication interface 244, all of which may be communicatively coupled by a communication link 245 that may take the form of a system bus, a network, or other connection mechanism.

Asset interface 243 may be configured to couple local analytics device 240 to the other on-board components of asset 230. For instance, asset interface 243 may couple local analytics device 240 to processor 232, which may enable local analytics device 240 to receive data from processor 232 (e.g., sensor data output by sensors 231) and to provide instructions to processor 232 (e.g., to control the operation of asset 230). In this way, local analytics device 240 may indirectly interface with and receive data from other on-board components of asset 230 via processor 232. Additionally, or alternatively, asset interface 243 may directly couple local analytics device 240 to one or more sensors 231 of asset 230. Local analytics device 240 may interface with the other on-board components of asset 230 in other manners as well.

Processor 242 may comprise one or more processor components that enable local analytics device 240 to execute data analytics programs and/or other complex operations, which may take the form of general-purpose processors, special-purpose processors, programmable logic devices, controllers, and/or any other processor components now known or later developed. In turn, data storage 243 may comprise one or more non-transitory computer-readable storage mediums that enable local analytics device 240 to execute data analytics programs and/or other complex operations, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 2D, data storage 243 may be arranged to contain executable program instructions (i.e., software) that cause local analytics device 240 to perform data analytics operations and/or other complex operations that go beyond the capabilities of the asset's other on-board components, as well as associated data that enables local analytics device 240 to perform these operations.

Communication interface 244 may be configured to facilitate wireless and/or wired communication between local analytics device 240 and various computing systems, including an asset data platform such as asset data platform 102. In this respect, local analytics device 240 may communicate the results of its operations to an asset data platform via communication interface 244, rather than via an on-board communication interface of asset 230. Further, in circumstances where asset 230 is not be equipped with its own on-board communication interface, asset 230 may use communication interface 244 to transmit operating data to an asset data platform. As such, communication interface 244 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 244 may also include multiple communication interfaces of different types. Other configurations are possible as well.

In addition to the foregoing, local analytics device 240 may also include other components that can be used to expand the on-board capabilities of an asset. For example, local analytics device 240 may optionally include one or more sensors that are configured to measure certain parameters, which may be used to supplement the sensor data captured by the asset's on-board sensors. Local analytics device 240 may include other types of components as well.

Returning to FIG. 2C, although not shown, asset 230 may also be equipped with hardware and/or software components that enable asset 230 to adjust its operation based on asset-related data and/or instructions that are received at asset 230 (e.g., from asset data platform 102 and/or local analytics device 235). For instance, as one possibility, asset 230 may be equipped with one or more of an actuator, motor, value, solenoid, or the like, which may be configured to alter the physical operation of asset 230 in some manner based on commands received from processor 232. In this respect, data storage 233 may additionally be provisioned with executable program instructions that cause processor 232 to generate such commands based on asset-related data and/or instructions received via communication interface 234. Asset 230 may be capable of adjusting its operation in other manners as well.

Further, although not shown, asset 230 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the on-board components of asset 230.

One of ordinary skill in the art will appreciate that FIGS. 2C-D merely show one example of the components of an asset, and that numerous other examples are also possible. For instance, the components of an asset may include additional components not pictured, may have more or fewer of the pictured components, and/or the aforementioned components may be arranged and/or integrated in a different manner. Further, one of ordinary skill in the art will appreciate that two or more of the components of asset 230 may be integrated together in whole or in part. Further yet, one of ordinary skill in the art will appreciate that at least some of these components of asset 230 may be affixed or otherwise added to asset 230 after it has been placed into operation.

V. Example Operations/Functionality of Brie

Figure 3:
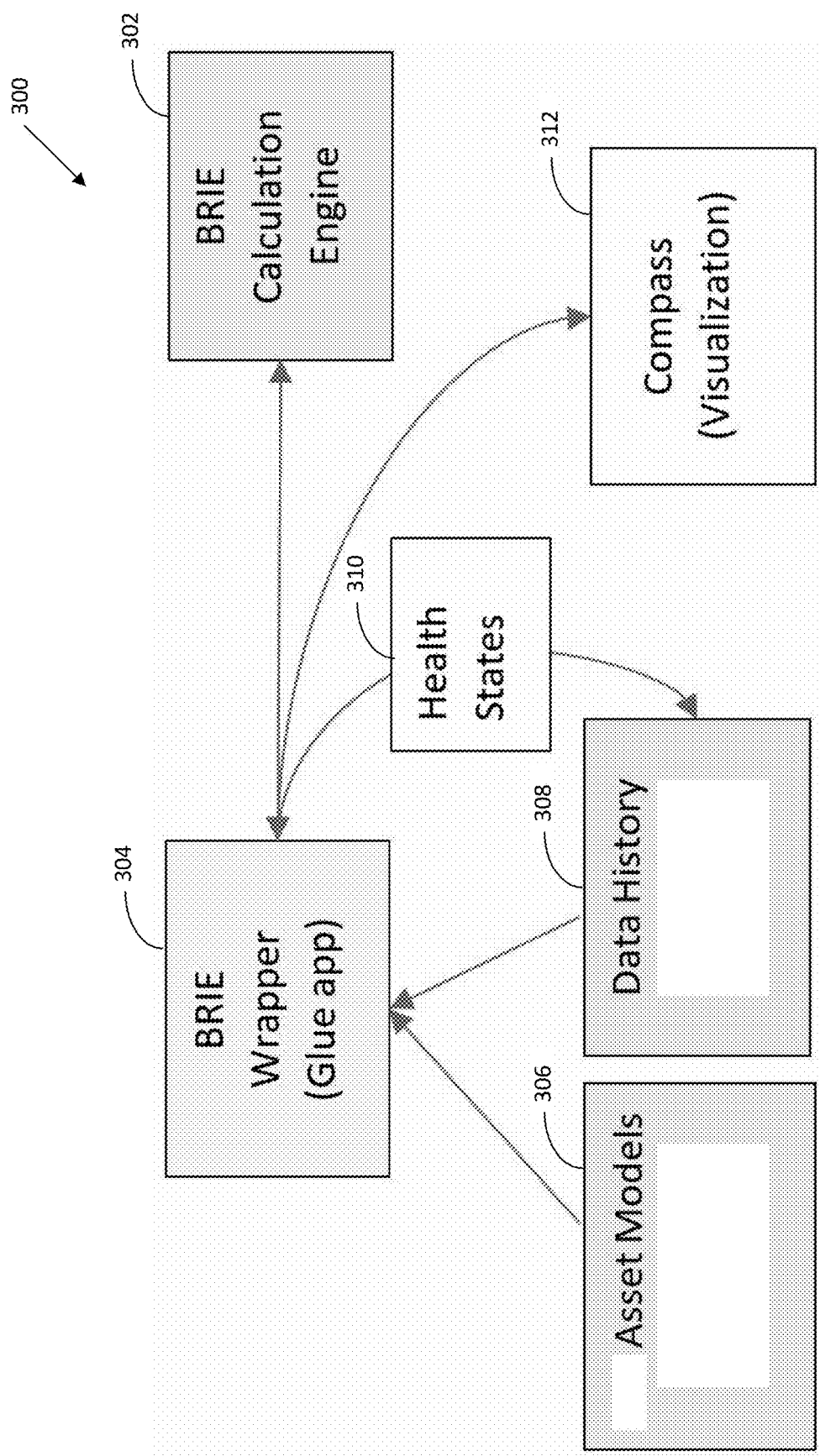
FIG. 3. depicts a simplified block diagram of an example Bayesian risk inference engine (BRIE) platform, in accordance with various embodiments.

FIG. 3. depicts a simplified block diagram of an example Bayesian risk inference engine (BRIE) configuration 300, in accordance with various embodiments. Generally, the BRIE configuration 300 is designed to be part of an extremely scalable solution, such as integrated into the asset data platform 102. In certain implementations, the BRIE configuration 300 may be implemented as a REST service from a docker image, thereby allowing the BRIE configuration 300 to be platform-agnostic. The BRIE configuration 300 generally includes a BRIE calculation engine 302, a BRIE wrapper 304, a set of asset models 306, a data history 308, a set of health states 310, and a visualization compass 312. The BRIE calculation engine 302 may generally perform some or all of the calculations described herein, such as generating health distributions, survival curves, etc. The BRIE calculation engine 302 may receive data from a plurality of sources, and generally may be scaled to run on multiple independent instances. In particular, and due to the Markov property of Bayesian inference, the BRIE calculation engine 302 may only require relatively small amounts of data for any given iteration of the survival curve generation sequences described herein.

More specifically, the BRIE calculation engine 302 may receive sensor data, observation data, operational data, environmental data, and/or any other suitable type of data to generate health distributions, update the health distributions, and generate survival curves. In order to do so, the BRIE calculation engine 302 may interface (directly or indirectly) with each of the BRIE wrapper 304, the asset models 306, the data history 308, the health states 310, and/or the compass 312. The BRIE wrapper 304 may generally mediate transmissions between/among the various components of the BRIE configuration 300, and/or may provide the BRIE engine 302 with any data required to perform the calculations/analysis described herein. The asset models 306 may generally be or include model representations of one or more assets that are monitored or otherwise analyzed by the BRIE configuration 300. These models may include parametric descriptions, thresholds, and/or other relevant data corresponding to the respective assets that may influence and/or otherwise inform the calculations/analysis performed by the BRIE calculation engine 302. The compass 312 may generally provide visualization services, such that any health states, observational distributions, survival curves, and/or any other data collected, interpreted, and/or generated by the BRIE configuration 300 may be represented visually for interpretation/analysis by a user.

The data history 308 and the health states 310 may collectively represent storage locations for sensor/observation/operational/environmental data, prior health states and/or other data utilized by the BRIE calculation engine 302 to perform the calculations/analysis described herein. The data history 308 may store real-time sensor data, historical sensor data, real-time observational data (e.g., triggered alerts/alarms), historical observational data, etc., and/or may store aggregate representations of some/all of this data. The health states 310 may store prior health states, such as a health state generated by the BRIE calculation engine 302 at the end of a survival curve generation iteration. As illustrated in FIG. 3, the data history 308 and the health states 310 may transmit data interchangeably, such that any of the data stored in the data history 308 may instead or also be stored in the health states 310, and vice versa.

During operation, a single iteration of the BRIE calculation engine 302 may only require data for a single asset over a predefined time period, as specified in the BRIE wrapper 304. Normally, this predefined time period may be twenty-four hours, but the predefined time period may be any suitable period, such as every hour, every two days, every week, every month, etc., based on the data collection and analysis frequency required and/or optimal for a particular asset. At the end of an iteration, the BRIE calculation engine 302 may transmit an adjusted health state to the data history 308 for storage, and this adjusted health state may be used as a prior health state during a subsequent iteration of the BRIE calculation engine 302. In this manner, only small amounts of data need to be sent to the BRIE calculation engine 302 for any given iteration because all previous data is described by the prior health state.

Figure 4:
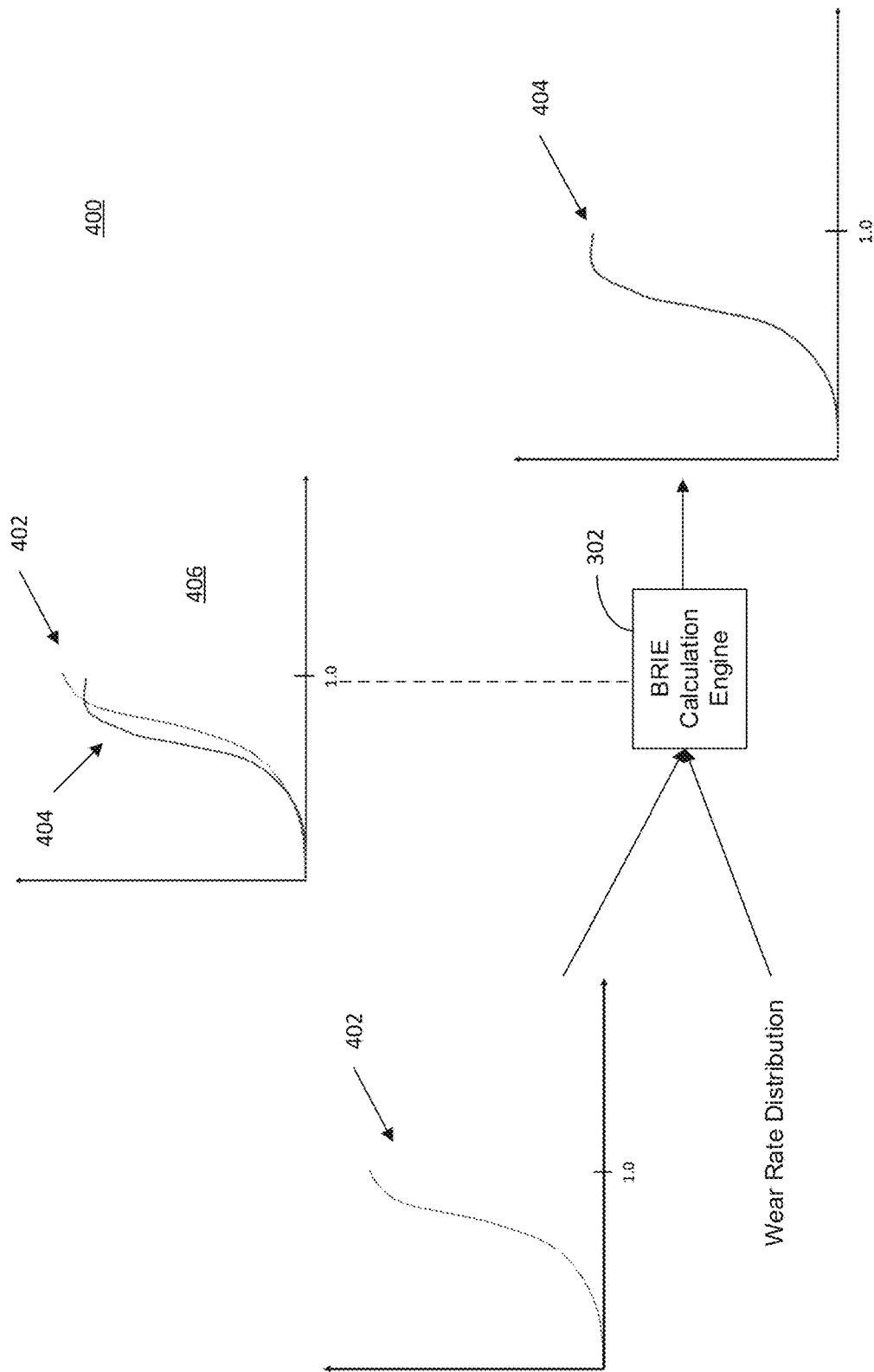
FIG. 4 depicts an example generation sequence of a predicted health distribution, in accordance with various embodiments.

FIG. 4 depicts an example generation sequence 400 of a predicted health distribution, in accordance with various embodiments. As previously mentioned, incorporating Bayesian methods into the predictions of health states and survival curves enables the present techniques to, inter alia, account for dynamically changing wear rates on health states $h_t$, apply imprecise observations (e.g., alarms and potentially work orders) to adjust the distribution of $h_t$, and create machine learning solutions that combine to enhance expert-driven knowledge of asset wear-out. A portion of these benefits are illustrated in FIG. 4, where the BRIE calculation engine 302 receives a prior health distribution 402 and a wear rate distribution as inputs, and outputs a predicted health distribution 404.

More specifically, the addition of the wear rate distribution to the prior health distribution 402 results in a shift of the prior health distribution 402, such that the predicted health distribution 404 of the asset indicates that the asset is slightly less healthy at the time instance represented by the predicted health distribution 404 relative to the health of the asset at the time instance represented by the prior health distribution 402. This shift is illustrated in FIG. 4 by the shifted health distribution graph 406, which depicts the shifting of the prior health distribution 402 performed by the BRIE calculation engine 302 based on the wear rate distribution to generate the predicted health distribution 404.

This shifting is the result of the general state-space Bayesian model utilized by the present techniques. Namely, the random-walk, Markov chain model described above in Section one is upgraded to a state-space Bayesian model by allowing for varying wear-rates (as represented in the wear rate distribution) and adding imprecise observations to the health state. As described in Section one, it was previously assumed that the random wear variable followed a constant Gamma distribution, represented generally by equation (7). However, some of the wear experienced by the asset may not be random, and may be modelled by the BRIE calculation engine 302 using a wear rate function $r(u_t)$, where $u_t$ is a set of measurements used to predict wear rate. Additionally, observations may be made $y_t$ that can give us hints about the state, as discussed herein in reference to FIG. 5. Overall, this state-space Bayesian model provides the general representation of asset health and survival predictions utilized by the BRIE calculation engine 302, and is reproduced below:

$$h_t = h_{t-1} + \sum_k w_k(u_t), \tag{17}$$

$$P(y_t|h_t) = f_o(y, h_t), \tag{18}$$

where, the distribution of $w_{k,t}$ is given by $$w(u_t) \sim f_G\left(\alpha \int_{t-1}^{t} r(u_t)dt, -\theta\right) \tag{19}$$

Equation (17) generally represents the transition model, which dictates how the asset health state evolves over time. The summation of $w_{k,t}$ over k indicates that the asset health may have more than one wear influence. Equation (18) is the observed state model, which dictates how the hidden wear state $h_t$ may affect any observations related to the asset. The wear contribution $w_{k,t}$ is noisy, but if it is comprised of a single wear influence, then the wear contribution is assumed to follow a Gamma distribution, represented as:

$$f_G\left(x, \alpha \int_{t-1}^{t} r(u_t)dt, -\theta\right) \tag{20}$$

In equation (20), $r(u_t)$ predicts the wear rate, which may be a value represented in any suitable timescale (e.g., years, months, days, etc.). Further, $\alpha$ reflects a frequency measure, while $\theta$ denotes scale, and the negative value of $\theta$ indicates that the asset health is decreasing to adjust the uncertainty around the prediction performed by the BRIE calculation engine 302. If $r(u_t)$ predicts the wear rate at the appropriate scale, then $1=\alpha\,\theta$, $\sigma=\sqrt{\alpha}\,\theta$ (e.g., the prediction error of the wear rate), and the form $P(y_t|h_t)=f_o(y_t, h_t)$ indicates that the observations considered by the BRIE calculation engine 302 are noisy and are influenced by the hidden wear state of equation (17). In particular, while the transition model of equation (17) fits the Kalman filter well, the observation models often contain alarms, which do not fit the Kalman filter framework. As a result, the BRIE calculation engine 302 utilizes a generalized Kalman filter observation model using Bayesian formulations.

Figure 5:
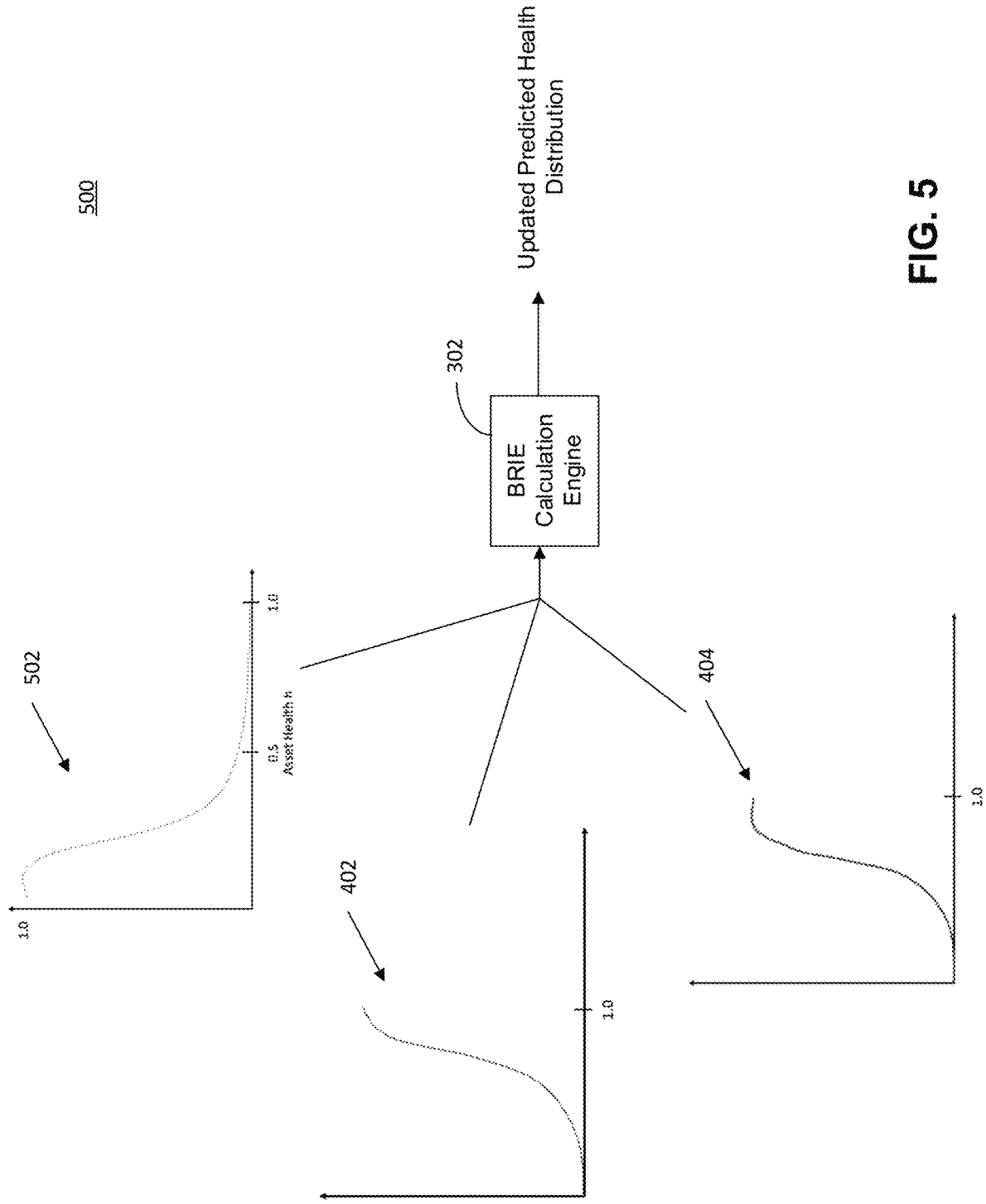
FIG. 5 depicts an example generation sequence of an updated predicted health distribution, in accordance with various embodiments.

The specific impact of these observation models is illustrated in FIG. 5, which depicts an example generation sequence 500 of an updated predicted health distribution, in accordance with various embodiments. Broadly speaking, the example generation sequence 500 includes the BRIE calculation engine 302 receiving the prior health distribution 402, the predicted health distribution 404, and an observed state distribution 502 as inputs, and outputting an updated predicted health distribution. More specifically, the observed state distribution 502 may correspond to an observed state (i.e., an observation or health indicator) associated with the asset that is indicative of a health state of the asset represented by the predicted health distribution 404. The BRIE calculation engine 302 may also calculate and utilize a normalized value representative of a probability of the observed state over one or more health values of the asset. Of course, it should be understood that the example generation sequence 500 may include any suitable number of observed state distributions 502, corresponding to any suitable number of observations/observed states of the asset.

In this manner, the updated predicted health distribution may account for and/or filter out potential health states of the asset based on observations regarding the asset. For example, the asset may include an alarm that is known to trigger when the asset has expended 80% of the asset's useful life. In this example, further assume that at a first time instance the predicted health distribution 404 indicates that the asset is likely at or below 20% useful life remaining, and that the alarm has not triggered. The BRIE calculation engine 302 may receive the predicted health distribution 404 and an observed state distribution 502 corresponding to the observation of the alarm being un-triggered at the first time instance, and may adjust the distribution in accordance with the observed state distribution 502 to reduce the overall likelihood in the updated predicted health distribution that the asset is likely at or below 20% useful life remaining. Accordingly, the observed state distribution 502 may act as a filter to reduce the likelihood of predicted health states in the updated predicted health distribution that conflict with the observed data.

To model these observations, the BRIE calculation engine 302 may account for two distinct types of observations—discrete and continuous. Discrete observations are alarms or other health indicators that indicate poor health, or that an asset will fail soon. Continuous observations provide a measure indicating a level of wear currently experienced by the asset.

These continuous observations are generally assumed to be Gaussian, while the discrete observations follow various types of sigmoid curves (e.g., similar to the partial/approximate sigmoid of the observed state distribution 502), as alarms indicating such discrete observations are typically inexact and subject to false positives or false negatives. For example, the BRIE calculation engine 302 may utilize a sigmoid curve for an alarm y that is given by the Gaussian cumulative density function, reproduced below:

$$P(y = \text{true}|h) = \frac{1}{2}\left[-1 + \text{erf}\left(\frac{h-\mu}{\sqrt{2}\,\sigma}\right)\right], \tag{21}$$

$$P(y = \text{false}|h) = \frac{1}{2}\left[1 + \text{erf}\left(\frac{h-\mu}{\sqrt{2}\,\sigma}\right)\right] \tag{22}$$

This form for discrete observed state distribution (e.g., observed state distribution 502) is particularly useful for the BRIE calculation engine 302 because the sigmoid curve of equations (21) and (22) represents the intuitive process of observing a measurement of h that is subject to Gaussian noise with variance $\sigma^2$, and determining if the measurement crosses an alarm threshold $\mu$. Practically speaking, alarms are often generated from noisy measurements, such that in certain embodiments, the BRIE calculation engine 302 may utilize the distribution cumulants (e.g., mean, variance, skewness, kurtosis, etc.) as part of generating the updated predicted health distribution. In these embodiments, the BRIE calculation engine 302 may obtain the cumulants of $f_h(h|t)$, subtract the observer threshold $\mu$ from the mean of $f_h(h|t)$, add the observer variance $\sigma^2$ to the variance of $f_h(h|t)$, and evaluate equations (21) and (22) at 0 from the resulting distribution.

In some embodiments, the BRIE calculation engine 302 may also sample average values of alarms or other discrete indicators over time when generating the updated predicted health distribution. To illustrate, the BRIE calculation engine 302 may aggregate a set of observation values during a time period associated with the predicted health distribution 404. Each observation value included in the set of observation values may be representative of one or more observed states of an asset component during a portion of the time period. Based on this set of observation values, the BRIE calculation engine 302 may generate the observed state distribution 502. For example, instead of recording/reporting every time an alarm was triggered during the time period associated with the predicted health distribution 404, the BRIE calculation engine 302 may simply report that the alarm was triggered a certain percentage of the time period. That certain percentage may constitute the y-axis value of the resulting observed state distribution (e.g., 502) utilized by the BRIE calculation engine 302.

More specifically, in these embodiments, the observed state y may no longer be binary but fuzzy. Thus, the BRIE calculation engine 302, may calculate a weighted exponent which generalizes the previous discrete expression in equations (21) and (22) to:

$$P(y|h) = \left(\frac{1}{2}\left[-1 + \text{erf}\left(\frac{h-\mu}{\sqrt{2}\sigma}\right)\right]\right)^y \left(\frac{1}{2}\left[1 + \text{erf}\left(\frac{h-\mu}{\sqrt{2}\sigma}\right)\right]\right)^{1-y} \quad (23)$$

As mentioned, the BRIE calculation engine 302 may receive an observed state distribution 502 representative of a continuous observation. These continuous observations have a Gaussian bell-shaped error distribution centered around the observed state value y. This may be represented as:

$$\hat{y} = f(h), \quad (24)$$

$$P(y|h) = \frac{1}{\sigma\sqrt{2\pi}} e^{-0.5\left(\frac{f(h)-y}{\sigma}\right)^2} \quad (25)$$

Thus, the BRIE calculation engine 302 may effectively determine measurements on h that are subject to Gaussian noise with variance $\sigma^2$. In circumstances where the BRIE calculation engine 302 determines and utilizes cumulants as part of the example generation sequence 500, the BRIE calculation engine 302 may obtain the cumulants of $f_h(h|t)$, subtract the observed state $\mu$ from the mean of $f_h(h|t)$, add the observer variance $\sigma^2$ to the variance of $f_h(h|t)$, and evaluate equation (25) at 0 from the resulting distribution.

In certain embodiments, the BRIE calculation engine 302 may also determine and/or apply weighting factors to observed state distributions to account for observational dependence on previously observed states. The BRIE calculation engine 302 may generally compare the observed state to a set of prior observed states obtained within a time period threshold relative to the observed state, and may determine whether or not the observed state is dependent from the set of prior observed states. If the BRIE calculation engine 302 determines that the observed state is dependent from the set of prior observed states, the engine 302 may apply a dependency weighting value to the observed state that reduces an impact of the observed state on the predicted health state.

Namely, if the observations represented by the observed state distribution 502 are close together in time with other similar observations, then the BRIE calculation engine 302 may determine that the observations are dependent. In many cases, maintenance tasks and conditioning monitoring may require a 1-week interval before independence can be assumed. To accommodate this, the BRIE calculation engine 302 may aggregate observation data within a window and treat the aggregated observation data as a single observation with a weight of 1. If more up-to-date information than the independence window allows is required (e.g., daily updates but need about a week for independence), then the BRIE calculation engine 302 may raise the observed state distribution by a dependency weighting value w to $P(y|h)^w$.

The BRIE calculation engine 302 may obtain this dependency weighting value, for example, by applying a first order autoregressive model. Such a model may include defining a time constant $\tau_{0.9}$, where the 0.9 indicates a 90% confidence level corresponding to observational independence. The BRIE calculation engine 302 may then apply this time constant to the weight expression:

$$w = 1 - e^{\frac{\log(1-0.9)}{\tau_{0.9}}\Delta t}, \quad (26)$$

where $\Delta t$ is the time elapsed since the last sample, such that a constant value of $\Delta t$ yields a constant dependency weighting value.

Moreover, it is not uncommon that triggering an alarm may have multiple underlying causes, such as an alarm on an asset/component that can be triggered by multiple degradation mechanisms/influences. In these circumstances, the BRIE calculation engine 302 may be broadly responsible for analyzing a set of prior observed states and a set of prior health states to evaluate a plurality of underlying causes of the observed state. The BRIE calculation engine 302 may then need to determine a predominant cause of the plurality of underlying causes of the observed state, and apply a cause weighting value (e.g., that is based on the predominant cause) to the observed state that adjusts the impact of the observed state on the predicted health state. For example, assume an alarm a occurs, but the alarm can be triggered by any of three degradation health states $h_1$, $h_2$, $h_3$. The BRIE calculation engine 302 may be tasked with finding the conditional probability of $h_1$ given the alarm $P(a|h_1)$. To find $P(a|h_1)$ the BRIE calculation engine 302 may multiply $P(a|h_1, h_2, h_3)$ by the probability densities that are not of interest (e.g., $f(h_2, h_3)$) and integrate, as part of a marginalization process that can be computationally difficult without simplifying assumptions. This calculation may be represented as:

$$P(a|h_1) = \iint P(a|h_1, h_2, h_3) f(h_2, h_3) dh_2 dh_3 \quad (27)$$

To simplify the computational load required by equation (27), the BRIE calculation engine 302 may apply and/or include independence assumptions on $h_1$, $h_2$, $h_3$ with respect to the probability that an alarm a does not occur (a'), given below:

$$P(a|h_1, h_2, h_3) = 1 - P(a'|h_1)P(a'|h_2)P(a'|h_3) \quad (28)$$

Another assumption the BRIE calculation engine 302 may make and/or may otherwise be included in the executed instructions is that the unmodeled nature of the wear states are independent, such that $f(h_1, h_2, h_3)=f(h_1) f(h_2) f(h_3)$. This assumption yields the following solution for the marginal probability, as included in the instructions of the BRIE calculation engine 302:

$$P(a|h_1)=1-P(a'|h_1)*[\int P(a'|h_2)f(h_2)dh_2]*[\int P(a'|h_3)f(h_3)dh_3] \quad (29),$$

which can be extended, without loss of generality, to any number of competing health states. The BRIE calculation engine 302 may then include and/or otherwise utilize the conditional probability of equation (29) in the Bayesian expression:

$$f(h_1|a) = \frac{P(a|h_1)f(h_1)}{\int P(a|h_1)f(h_1)dh}, \quad (30)$$

which the BRIE calculation engine 302 may have previously solved by sampling values of $P(a|h_1) f(h_1)$ and calculating cause weighting values for those sampled values.

The BRIE calculation engine 302 may interpret and/or generalize the result(s) represented by equation (30) to any number of health indicators. Importantly, equation (30) has the property that if any health state is at or near a point where the alarm a is likely, then the integral term of equation (30) may be small, and thus diminish the effect that $P(a'|h_1)$ would have on the final result $P(a|h_1)$. This directly reflects the determinations made by the BRIE calculation engine 302 that if an alarm may be triggered by a poor health state $h_i$, but the alarm may also be triggered by another state $h_k$ (e.g., a severely degraded health state), then the alarm provides little information on $h_i$. Thus, the BRIE calculation engine 302 may not be able to evaluate the potential impacts of the health state $h_i$ because the known degraded state of $h_k$ may be the predominant cause of the underlying causes, and thereby explains away the alarm.

In any event, the BRIE calculation engine 302 may generally take the predicted current health (h) 404, at time t, and condition the predicted current health 404 based on an observed state distribution (y) 502. More specifically, the BRIE calculation engine 302 may calculate the conditional distribution $f_h(h|t, y)$, which is obtained using Bayes' theorem, given by:

$$f_h(h|t, y) = \frac{P(y|h)f_h(h|t)}{\int P(y|h)f_h(h|t)dh}, \quad (31)$$

where $P(y|h)$ is the probability of observing y for a given value of h, and $f_h(h|t)$ is the prior distribution of the possible values of h. If y is representative of an alarm-like observation (e.g., a triggered alarm state), then equation (31) follows the sigmoid curves previously described. If y is representative of a measurement-like observation (e.g., real-time sensor data), then equation (31) often assumes an approximately Gaussian distribution.

Generally, when a prior health distribution $f_h(h|t)$ is available from the health states (e.g., health state 310) and/or the data history (e.g., data history 308), the BRIE calculation engine 302 can retrieve this prior health distribution and determine the conditional distribution for the health state of the asset based on the equation (31). Thus, an advantage of the Bayesian formulation utilized by the BRIE calculation engine 302 is the ability to use the prior solution $f_h(h|t, y)$ (i.e., the posterior) to generate the subsequent solution, thereby enabling the dynamic Bayesian inference. In other words, the predicted health distribution may be a first predicted health distribution generated at a first time, and at a second time subsequent to the first time, the first predicted health distribution is the prior health distribution used by the BRIE calculation engine 302 to generate a second predicted health distribution.

To obtain the prior solution, the BRIE calculation engine 302 may add the w t noise directly to the previous $f_h(h|t, y)$ estimates during every iteration of the BRIE calculation engine 302 execution. The BRIE calculation engine 302 may then add negative-gamma-distributed noise and predicted wear to the previous health distribution, in accordance with the below equation:

$$h_t = h_{t-1} + \sum_k w_{k,t} \quad (32)$$

Subsequently, the BRIE calculation engine 302 may update the health distribution using the version of Bayes' Theorem as follows:

$$f_h(h|t, y) = \frac{P(y|h)f_h(h|t^*)}{\int P(y|h)f_h(h|t)dh} \quad (33)$$

Equation (33) may be interpreted as a general version of the Kalman filter, and one result of this direct approach is that the operations performed by the BRIE calculation engine 302 become more convoluted with every iteration. For example, expanding the equation (33) to include the previous time step, the expression utilized by the BRIE calculation engine 302 becomes:

$$f_h(h|t, y) = \frac{P(y|h)\int_{-\infty}^{\infty} f_h(h-z|t-1, y)f_w(z)dz}{\int P(y|h)\int_{-\infty}^{\infty} f_h(h-z|t-1, y)f_w(z)dzdh}, \quad (34)$$

meaning the next iteration of the BRIE calculation engine 302 would require a convolution within a convolution, and the subsequent iteration would require a convolution within a convolution within a convolution. Thus, in certain instances, the BRIE calculation engine 302 may replace these convolutions represented by equations (33) and (34) by using cumulants. More specifically, in some embodiments, the BRIE calculation engine 302 may perform the predict-update method on $f_h(h|t-1, y)$ by combining predictor cumulants with the prior cumulants, and approximating Bayes' theorem to determine the moments/cumulants of the final expression.

Figure 6:
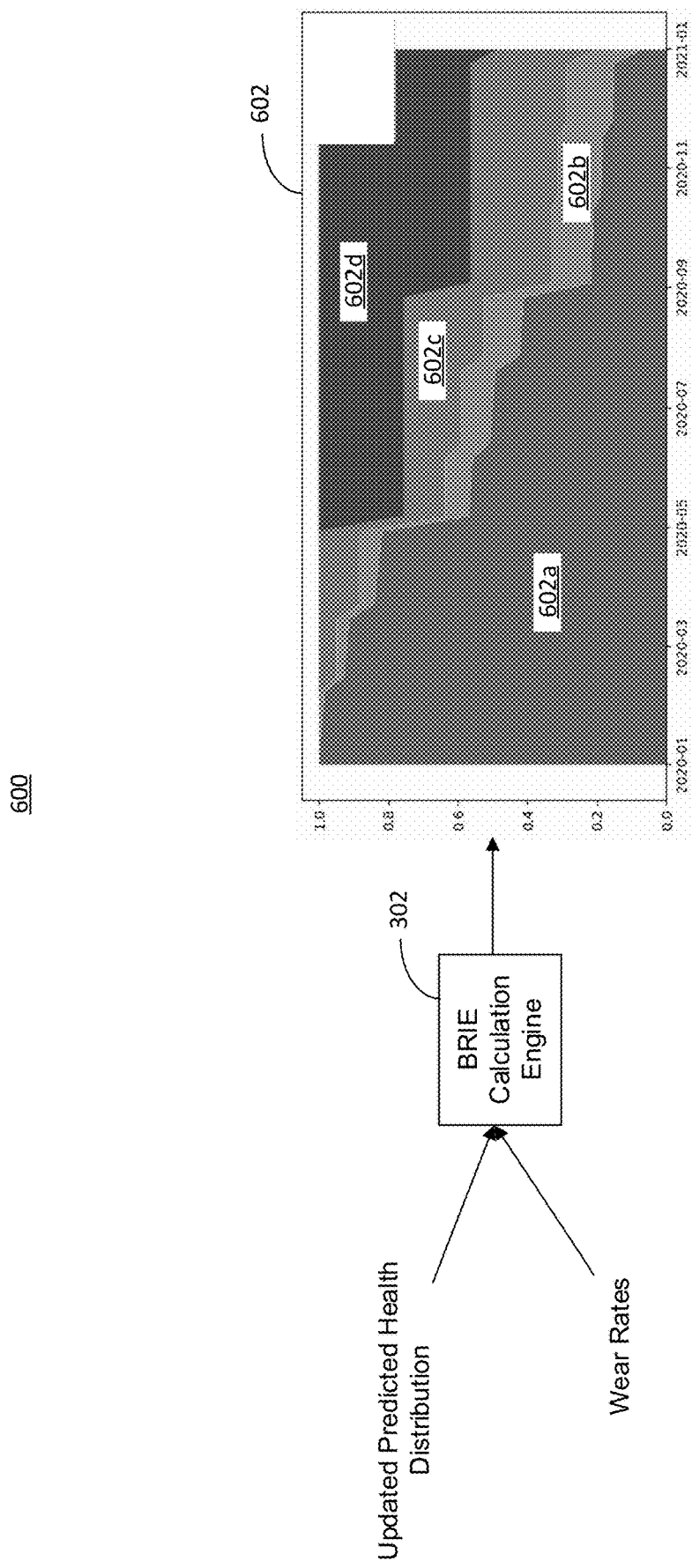
FIG. 6 depicts an example generation sequence of a set of survival curves, in accordance with various embodiments.

FIG. 6 depicts an example generation sequence 600 of a set of survival curves 602, in accordance with various embodiments. Generally speaking, the example generation sequence 600 includes the BRIE calculation engine 302 receiving the updated predicted health distribution and a set of wear rates to generate the set of survival curves 602 as an output. As mentioned herein, the set of survival curves 602 may generally represent the probability that an asset survives (i.e., does not fail) and/or otherwise continues to successfully operate at a given time in the future. As illustrated in FIG. 6, the set of survival curves 602 includes four regions 602a-d, that each represent various survival/ failure probabilities. Of course, it should be understood that the survival curve(s) generated by the BRIE calculation engine 302 may generally include any suitable number of survival curves (e.g., 1, 2, 5, 10), and the survival curves may predict any suitable length of time into the future based on the operations described herein.

The first region 602a may generally correspond to a probability that the asset survives at a given time. The second region 602b may generally correspond to a probability that the asset fails at a given time. The third region 602c may generally correspond to a probability that the asset receives unplanned maintenance at a given time, and as a result, the asset survives. The fourth region 602d may generally correspond to a probability that the asset receives planned maintenance at a given time, and as a result, the asset survives. Thus, as illustrated in the set of survival curves 602 in FIG. 6, the survival probability of the asset over time can be meticulously predicted using the techniques of the present disclosure in a manner that conventional techniques are simply incapable of providing.

In order to generate these survival curves 602, the BRIE calculation engine 302 may receive the updated predicted health distribution and proceed to analyze the distribution in view of the wear rates. In particular, the BRIE calculation engine 302 may calculate a reliability function for an asset using the updated predicted health distribution and wear rates, assuming that the asset has not yet failed. The BRIE calculation engine 302 may perform Bayesian prediction steps to the desired points in the future, which may utilize slightly different formulations depending on the form of the updated predicted health distribution. If the BRIE calculation engine 302 is generating a parametric distribution for the survival curves, then the BRIE calculation engine 302 may obtain the survival/reliability curve by adding cumulants of a gamma wear distribution, such that the conditional reliability probability is given as:

$$R(\Delta t) = 1 - \frac{F_{h|\Delta t}(0) - F_{h|0}(0)}{1 - F_{h|0}(0)}, \quad (35)$$

where $F_{h|\Delta t}(0)$ is the cumulative density function (CDF) of the final distribution at 0, $F_{h|0}(0)$ is the CDF of the initial distribution at 0, and $1-F_{h|0}(0)$ represents the BRIE calculation engine 302 truncating the distribution to only support positive health values at the beginning of the curve.

On the other hand, if the BRIE calculation engine 302 is generating a non-parametric distribution for the survival curves, then the BRIE calculation engine 302 may calculate the survival/reliability curve by performing a weight reallocation among various predicted health states to determine a normalization constant, which is the reliability function:

$$R(\Delta t) = KN = \sum_i p_h(x_i) \quad (36)$$

Accordingly, the BRIE calculation engine 302 may calculate survival curves (e.g., set of survival curves 602) for any type of distribution of predicted health states.

When the BRIE calculation engine 302 determines a survival curve or a set of survival curves 602 for a particular asset, the engine 302 may then proceed to aggregate the survival curves. By default, the BRIE calculation engine 302 may assume that every component (or failure location) is critical, such that that the failure of any component may result in failure of the asset. In circumstances where components or other portions of an asset are deemed/labelled as non-critical, then the BRIE calculation engine 302 may not factor these non-critical components/portions, and their corresponding survival curves, into the generation of the survival curves. Generally though, each failure mode may correspond to a respective probability of disabling the asset, such that failure modes associated with non-critical components may be considered non-critical failure modes, whereas failure modes associated with critical components may be considered critical failure modes. Thus, when aggregating survival curves, the BRIE calculation engine 302 may apply a respective disabling weighting value to the survival curve for each failure mode prior to aggregating the survival curve for each failure mode into the aggregate survival curve. The respective disabling weighting value may be based on a probability of disabling the asset corresponding to the failure mode represented by the survival curve.

For example, a first failure mode may cause the asset to fail entirely, so the BRIE calculation engine 302 may apply a disabling weighting value of 1 to the first failure mode during survival curve aggregation. In this example, a second failure mode may not likely cause the asset to fail, so the BRIE calculation engine 302 may apply a disabling weighting value of to the second failure mode during survival curve aggregation. Further, a third failure mode may not cause the asset to fail at all, so the BRIE calculation engine 302 may apply a disabling weighting value of 0 to the third failure mode during survival curve aggregation. Regardless, the BRIE calculation engine 302 may aggregate the survival curves into an aggregate survival curve in accordance with the following:

$$R(t) = \prod_c R_c(t) \quad (37)$$

Moreover, in certain embodiments, the BRIE calculation engine 302 may sample the prior health distribution and the wear rate distribution at a same plurality of points prior to generating the predicted health distribution, in accordance with equation (33). For example, the BRIE calculation engine may sample the prior health distribution and the wear rate distribution at 120 equivalent points, and may thereafter generate the predicted health distribution as 120 points. Namely, the BRIE calculation engine 302 may then generate the predicted health distribution based on the same 120 points of both the prior health distribution and the wear rate distribution, and may sample the observed state distribution at the same 120 points prior to updating the predicted health distribution. The BRIE calculation engine 302 may then update the predicted health distribution based on the same 120 points of the observed state distribution, and the BRIE calculation engine 302 may then generate the survival curve based on the 120 points of the predicted health distribution. In these embodiments, the BRIE calculation engine 302 may then interpolate the aggregate survival curve from the same 120 points of each survival curve prior to causing the client device to display the visual representation of the aggregate survival curve of the asset. Of course, the BRIE calculation engine 302 may sample the relevant distributions over any suitable plurality of points, such as 50, 100, 120, etc.

In some embodiments, the BRIE calculation engine 302 may incorporate maintenance considerations into the calculation and/or aggregation of the survival curves (e.g., 602) for an asset. When incorporating such maintenance considerations, the BRIE calculation engine 302 may receive an indication of a result of the maintenance, including a verification of good condition of the asset/component(s), a verification of poor condition of the asset/component(s), a repair of the asset/component(s), and/or any other suitable indication related to maintenance of the asset or components related to the asset. For example, the indications verifying good or poor condition may function as alarm events with their own detection curves, and the indication of a repair event may be or include a reset of the degradation state. Ultimately, the detection of any alarm or negative maintenance indication (e.g., poor condition) may cause the BRIE calculation engine 302 to output an alert/alarm to a user and/or directly to a maintenance provider to initiate/perform a maintenance action with respect to the asset/component(s) implicated in the maintenance indications.

Generally, the survival curves output by the BRIE calculation engine 302 in accordance with equations (36) and (37) give a probability of failure if no maintenance is being performed on the asset. However, asset is commonly performed throughout an asset's lifetime, and may take two broad forms: planned/preventative maintenance, where the equipment is flagged to be operated on during the next planned downtime; and unplanned/on-condition maintenance, where the equipment is brought offline immediately (halting production) for servicing. The BRIE calculation engine 302 may distinguish between these two scenarios (as well as failures), and it should be understood that the following algorithms may be extended to any number of maintenance and/or other classifications.

The BRIE calculation engine 302 may generally include algorithms/models for multiple cases corresponding to the survivability of the asset based on types of maintenance performed on the asset/component(s). Namely, the probability of failures at a time $t_1$ may be given as:

$$p(F \mid t_1) = \frac{\int_{-\infty}^{0} f(h \mid t_1^*) dh - \int_{-\infty}^{0} f(h \mid t_0) dh}{\int_{0}^{\infty} f(h \mid t_0) dh}, \quad (38)$$

$$= \frac{F_h(0 \mid t_1^*) - F_h(0 \mid t_0)}{1 - F_h(0 \mid t_0)} \quad (39)$$

For the remaining non-failure cases, the BRIE calculation engine 302 may utilize a probability of maintenance given as weighted sum of cases where maintenance was flagged (y=1):

$$p(M \mid t_1) = \int_{0}^{\infty} p(y = 1 \mid h) \frac{f_h(h \mid t_1^*)}{1 - F_h(0 \mid t_0)} dh, \quad (40)$$

which may be allocated to maintenance task M (e.g., M may be planned or unplanned maintenance). Conversely, the BRIE calculation engine 302 may utilize a probability of continuing without maintenance that is the weighted sum of cases where maintenance was not flagged (y=0):

$$p(C \mid t_1) = \int_{0}^{\infty} p(y = 0 \mid h) \frac{f_h(h \mid t_1^*)}{1 - F_h(0 \mid t_0)} dh \quad (41)$$

The BRIE calculation engine 302 may then perform Bayesian conditioning over the cases where maintenance was not triggered, as given by:

$$f_h(h \mid t_1) = \frac{p(y = 0 \mid h) f_h(h \mid t_1^*)}{\int_{-\infty}^{\infty} p(y = 0 \mid h) f_h(h \mid t_1^*) dh}, \quad (42)$$

and then apply wear predictions (e.g., through cumulants) to yield:

$$k_{t_2}^* = (k_{t_1} + k_w) \mapsto f_h(h \mid t_2^*) \quad (43)$$

The BRIE calculation engine 302 may then generalize these formulations represented in equations (38)-(43) into a recursive operation used by the engine 302 to produce maintenance/failure probability curves (e.g., the set of survival curves 602). To account for applying this generalization on a subset of cases that continued without maintenance/failures, the BRIE calculation engine 302 may multiply the maintenance and failure values by $p(C|t_1)$, and add this multiplied value on to the previous values, such that:

$$p(F \mid t_2) = p(F \mid t_1) + p(C \mid t_1) \frac{F_h(0 \mid t_2^*) - F_h(0 \mid t_1)}{1 - F_h(0 \mid t_1)}, \quad (44)$$

$$p(M \mid t_2) = p(M \mid t_1) + p(C \mid t_1) \int_{0}^{\infty} p(y = 1 \mid h) \frac{f_h(h \mid t_2^*)}{1 - F_h(0 \mid t_1)} dh \quad (45)$$

As a result, the BRIE calculation engine 302 may calculate the total probability of continuing by multiplying the previous value by the current continuation rate, given as:

$$p(C \mid t_2) = p(C \mid t_1) \int_{0}^{\infty} p(y = 0 \mid h) \frac{f_h(h \mid t_2^*)}{1 - F_h(0 \mid t_1)} dh \quad (46)$$

The BRIE calculation engine 302 may also perform normalization to yield:

$$f_h(h \mid t_2) = \frac{p(y = 0 \mid h) f_h(h \mid t_2^*)}{\int_{-\infty}^{\infty} p(y = 0 \mid h) f_h(h \mid t_2^*) dh}, \quad (48)$$

$$\kappa_{t_3}^* = (\kappa_{t_2} + \kappa_w) \mapsto f_h(h \mid t_3^*),$$

such that the BRIE calculation engine 302 may tally the results for each maintenance task type M, in addition to the continue/survival and failure categories. The BRIE calculation engine 302 may recursively apply these calculations throughout a desired time period, and these calculations may be used to plot the outcome breakdown over time as shown in the set of survival curves 602. In particular, and as previously described, the set of survival curves 602 includes the first region 602a corresponding to asset survivability based on continuing without maintenance, the second region 602b corresponding to asset failure, the third region 602c corresponding to asset survivability based on unplanned maintenance tasks, and the fourth region 602d corresponding to asset survivability based on planned maintenance tasks.

However, the BRIE calculation engine 302 may also utilize different characterizations for maintenance and/or other factors that influence survival rates of an asset. For example, assume that the BRIE calculation engine 302 is configured to incorporate any instance where the asset may continue without maintenance, receive any planned/unplanned maintenance, and/or if any failure events occur. In other words, in this example, the BRIE calculation engine 302 may be configured to include any instance where the operation of the asset may be negatively impacted for any reason, such as temporary disablement for maintenance up to (and including) permanent disablement due to total failure. In this case, the expressions utilized by the BRIE calculation engine 302 over the entire point of failure may be:

$$p(C_{all} | t) = \prod_k p(C_k | t), \quad (49)$$

$$p(P_{any} | t) = \left[\prod_k (p(C_k | t) + p(P_k | t))\right] - \left[\prod_k p(C_k | t)\right], \quad (50)$$

$$p(U_{any} | t) = \quad (51)$$
$$\left[\prod_k (p(C_k | t) + p(P_k | t) + p(U_k | t))\right] - \left[\prod_k (p(C_k | t) + p(P_k | t))\right],$$

$$p(F_{any} | t) = 1 - \prod_k (1 - p(F_k | t)), \quad (52)$$

where $p(C_{all}|t)$ corresponds to continuing without maintenance, $p(P_{any}|t)$ corresponds to planned maintenance instances, $p(U_{any}|t)$ corresponds to unplanned maintenance instances, and $p(F_{any}|t)$ corresponds to failure instances.

In any event, when the BRIE calculation engine 302 completes generation of the survival curves (e.g., set of survival curves 602), then the BRIE calculation engine 302 may transmit the survival curves to a client device (e.g., client station 106A) for display to a user. Namely, the BRIE calculation engine 302 may transmit the survival curves to the BRIE wrapper 304, which in turn, may transmit the survival curves to the compass 312. The compass 312 may transmit instructions to the client device and/or otherwise cause the client device to render the survival curves, the updated predicted health distribution, and/or any other inputs/outputs to/from the BRIE calculation engine 302. In this manner, the user/client may view the set of survival curves 602, may interact with the asset data, schedule maintenance, and/or perform any other suitable action(s) or combinations thereof.

Figure 7:
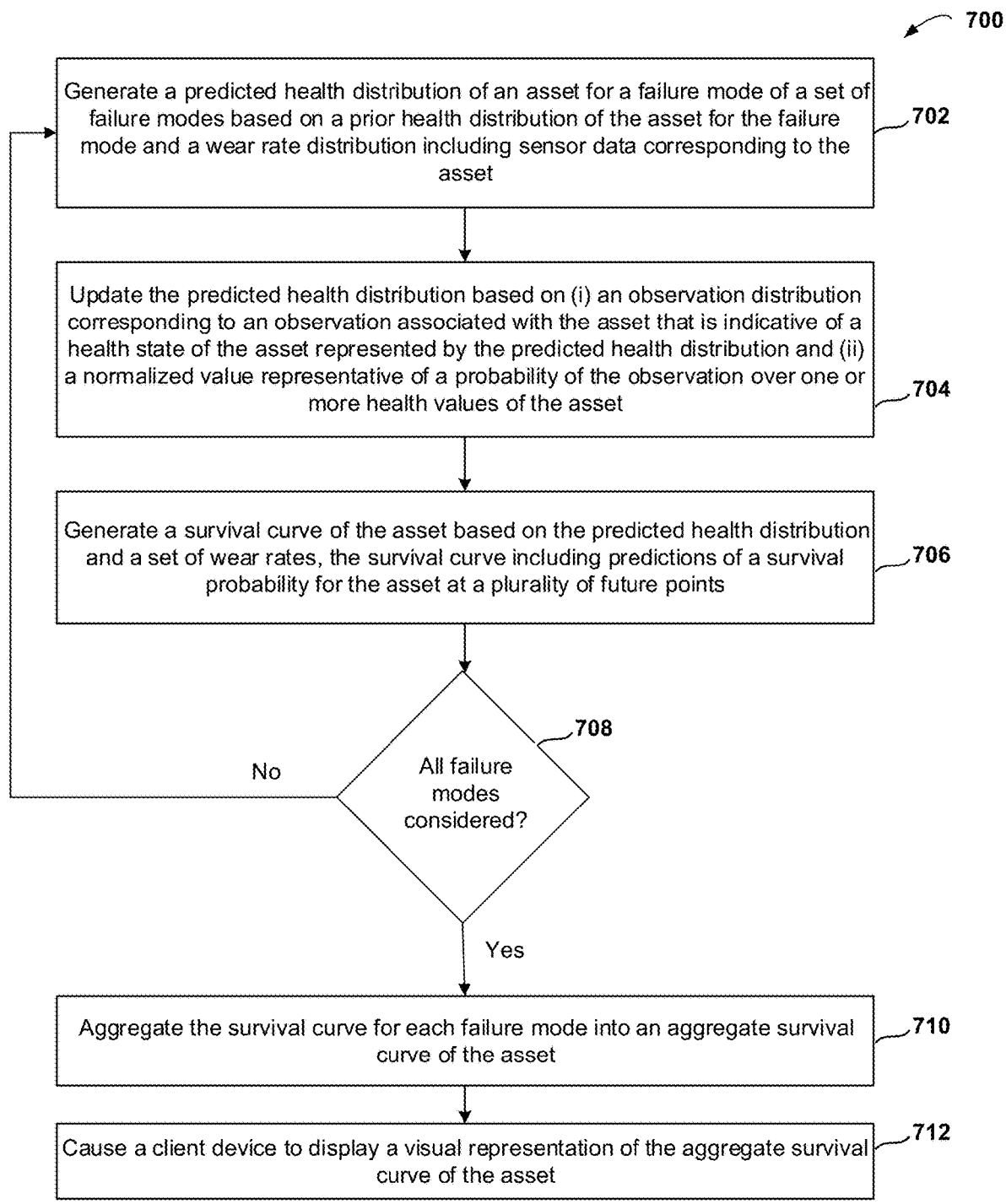
FIG. 7 is a flow diagram depicting a method for implementing a BRIE, in accordance with various embodiments.

FIG. 7 is a flow diagram depicting a method 700 for implementing a BRIE(e.g., BRIE configuration 300), in accordance with various embodiments. In some cases, each block may represent a module or portion of program code that includes instructions that are executable by a processor to implement specific logical functions or steps as part of the method 700. The program code may be stored on any type of computer-readable medium, such as non-transitory computer-readable media. In other cases, each block may represent circuitry that is wired to perform specific logical functions or steps as part of the method 700. Moreover, the blocks shown in the flow diagram of FIG. 7 may be rearranged into different orders, combined into fewer blocks, separated into additional blocks, and/or removed based upon the particular embodiment.

For purposes of illustration only, the method 700 is described as being carried out by processors of the asset data platform 102, 200, and 210 of FIGS. 1-2B executing instructions encoded in the BRIE configuration 300 of FIG. 3, but it should be understood that the method 700 may be carried out by computing platforms that take other forms as well.

Further, it should be understood that the disclosed process is merely described in this manner for the sake of clarity and explanation, and that the example embodiment may be implemented in various other manners, including the possibility that functions may be added, removed, rearranged into different orders, combined into fewer blocks, and/or separated into additional blocks depending upon the particular embodiment.

The method 700 includes generating a predicted health distribution of an asset for a failure mode of a set of failure modes based a prior health distribution of the asset for the failure mode and a wear rate distribution based on sensor data corresponding to the asset (block 702). For example, the wear rate distribution may be based on sensor data corresponding to the asset, where the wear rate distribution can be calculated from sensor data and/or the wear rate distribution can be inferred from or otherwise determined from sensor data, e.g., sensor data defining the lifespan of the asset, use of the asset, or parameter of the assert suggesting wear or usage of the asset. The method 700 further includes updating the predicted health distribution based on (i) an observed state distribution corresponding to an observed state associated with the asset that is indicative of a health state of the asset represented by the predicted health distribution and (ii) a normalized value representative of a probability of the observed state over one or more health values of the asset (block 704).

The method 700 further includes generating a survival curve of the asset based on the predicted health distribution and a set of wear rates (block 706). The survival curve may include predictions of a survival probability for the asset at a plurality of future points. The method 700 may further include determining whether or not all failure modes for the asset have been considered (block 708). Responsive to determining that not all failure modes of the asset have been considered (NO branch of block 708), then the method 700 may proceed back to block 702 to iteratively perform the actions associated with each of blocks 702-706 for each failure mode of the set of failure modes.

Responsive to determining that all failure modes have been considered for the asset (YES branch of block 708), the method 700 may further include aggregating the survival curve for each failure mode into an aggregate survival curve of the asset (block 710). The method 700 may further include causing a client device to display a visual representation of the aggregate survival curve of the asset (block 712).

In certain embodiments, the method 700 may further include updating the predicted health distribution by: aggregating a set of observation values during a time period associated with the predicted health distribution. In these embodiments, each observation value included in the set of observation values may be representative of one or more observed states of an asset component during a portion of the time period. Further in these embodiments, the method 700 may also include generating the observed state distribution based on the set of observation values.

In some embodiments, each failure mode may correspond to a respective probability of disabling the asset. In these embodiments, the method 700 may further include aggregating the survival curve for each failure mode into the aggregate survival curve of the asset by: applying a respective disabling weighting value to the survival curve for each failure mode prior to aggregating the survival curve for each failure mode into the aggregate survival curve. In these embodiments, the respective disabling weighting value may be based on a probability of disabling the asset corresponding to the failure mode represented by the survival curve.

In certain embodiments, the method 700 may further include updating the predicted health distribution by: comparing the observed state to a set of prior observed states obtained within a time period threshold relative to the observed state; determining whether or not the observed state is dependent from the set of prior observed states; and responsive to determining that the observed state is dependent from the set of prior observed states, applying a dependency weighting value to the observed state that reduces an impact of the observed state on the predicted health distribution.

In some embodiments, the method 700 may further include updating the predicted health distribution by: analyzing a set of prior observed states and a set of prior health states to evaluate a plurality of underlying causes of the observed state; determining a predominant cause of the plurality of underlying causes of the observed state; and applying a cause weighting value to the observed state that adjusts an impact of the observed state on the predicted health distribution, wherein the weighting cause value is based on the predominant cause.

In certain embodiments, the survival curve for each failure mode and the aggregate survival curve of the asset include predictions of the survival probability for the asset at the plurality of future points based on a plurality of maintenance potentials that includes: (i) no maintenance, (ii) planned maintenance, (iii) unplanned maintenance, and (iv) failure prior to maintenance.

In some embodiments, the method 700 further includes sampling the prior health distribution and the wear rate distribution at a same plurality of points prior to generating the predicted health distribution; generating the predicted health distribution based on the same plurality of points of both the prior health distribution and the wear rate distribution; sampling the observed state distribution at the same plurality of points prior to updating the predicted health distribution; updating the predicted health distribution based on the same plurality of points of the observed state distribution; generating the survival curve based on the same plurality of points of the predicted health distribution; and interpolating the aggregate survival curve from the same plurality of points of each survival curve prior to causing the client device to display the visual representation of the aggregate survival curve of the asset.

In certain embodiments, the predicted health distribution is a first predicted health distribution generated at a first time, and at a second time subsequent to the first time, the first predicted health distribution is the prior health distribution.

Aspects of the Disclosure

1. A computing platform for generating survival curves for an asset comprising: a communication interface; one or more processors; a non-transitory computer-readable medium storing a Bayesian risk inference engine (BRIE); and program instructions stored on the non-transitory computer-readable medium that are executable by the one or more processors to cause the computing platform to: (a) generate, by executing the BRIE, a predicted health distribution of an asset for a failure mode of a set of failure modes based on a prior health distribution of the asset for the failure mode and a wear rate distribution based on sensor data corresponding to the asset, (b) update, by executing the BRIE, the predicted health distribution based on (i) an observed state distribution corresponding to an observed state associated with the asset that is indicative of a health state of the asset represented by the predicted health distribution and (ii) a normalized value representative of a probability of the observed state over one or more health values of the asset, (c) generate, by executing the BRIE, a survival curve of the asset based on the predicted health distribution and a set of wear rates, the survival curve including predictions of a survival probability for the asset at a plurality of future points, iteratively perform (a)-(c) for each failure mode of the set of failure modes, aggregate, by executing the BRIE, the survival curve for each failure mode into an aggregate survival curve of the asset, and cause a client device to display a visual representation of the aggregate survival curve of the asset.

2. The computing platform of aspect 1, wherein the program instructions, when executed by the one or more processors, further cause the computing platform to update the predicted health distribution by: aggregating, by executing the BRIE, a set of observation values during a time period associated with the predicted health distribution, wherein each observation value included in the set of observation values is representative of one or more observed states of an asset component during a portion of the time period; and generating, by executing the BRIE, the observed state distribution based on the set of observation values.

3. The computing platform of any of aspects 1-2, wherein each failure mode corresponds to a respective probability of disabling the asset, and the program instructions, when executed by the one or more processors, further cause the computing platform to aggregate the survival curve for each failure mode into the aggregate survival curve of the asset by: applying, by executing the BRIE, a respective disabling weighting value to the survival curve for each failure mode prior to aggregating the survival curve for each failure mode into the aggregate survival curve, wherein the respective disabling weighting value is based on a probability of disabling the asset corresponding to the failure mode represented by the survival curve.

4. The computing platform of any of aspects 1-3, wherein the program instructions, when executed by the one or more processors, further cause the computing platform to update the predicted health distribution by: comparing, by executing the BRIE, the observed state to a set of prior observed states obtained within a time period threshold relative to the observed state; determining, by executing the BRIE, whether or not the observed state is dependent from the set of prior observed states; and responsive to determining that the observed state is dependent from the set of prior observed states, applying, by executing the BRIE, a dependency weighting value to the observed state that reduces an impact of the observed state on the predicted health distribution.

5. The computing platform of any of aspects 1-4, wherein the program instructions, when executed by the one or more processors, further cause the computing platform to update the predicted health distribution by: analyzing, by executing the BRIE, a set of prior observed states and a set of prior health states to evaluate a plurality of underlying causes of the observed state; determining, by executing the BRIE, a predominant cause of the plurality of underlying causes of the observed state; and applying, by executing the BRIE, a cause weighting value to the observed state that adjusts an impact of the observed state on the predicted health distribution, wherein the weighting cause value is based on the predominant cause.

6. The computing platform of any of aspects 1-5, wherein the survival curve for each failure mode and the aggregate survival curve of the asset include predictions of the survival probability for the asset at the plurality of future points based on a plurality of maintenance potentials that includes: (i) no maintenance, (ii) planned maintenance, (iii) unplanned maintenance, and (iv) failure prior to maintenance.

7. The computing platform of any of aspects 1-6, wherein the program instructions, when executed by the one or more processors, further cause the computing platform to: sample, by executing the BRIE, the prior health distribution and the wear rate distribution at a same plurality of points prior to generating the predicted health distribution; generate, by executing the BRIE, the predicted health distribution based on the same plurality of points of both the prior health distribution and the wear rate distribution; sample, by executing the BRIE, the observed state distribution at the same plurality of points prior to updating the predicted health distribution; update, by executing the BRIE, the predicted health distribution based on the same plurality of points of the observed state distribution; generate, by executing the BRIE, the survival curve based on the same plurality of points of the predicted health distribution; and interpolate, by executing the BRIE, the aggregate survival curve from the same plurality of points of each survival curve prior to causing the client device to display the visual representation of the aggregate survival curve of the asset.

8. The computing platform of any of aspects 1-7, wherein the predicted health distribution is a first predicted health distribution generated at a first time, and at a second time subsequent to the first time, the first predicted health distribution is the prior health distribution.

9. A computer-implemented method for generating survival curves for an asset comprising: (a) generating, by one or more processors executing a Bayesian risk inference engine (BRIE), a predicted health distribution of an asset for a failure mode of a set of failure modes based on a prior health distribution of the asset for the failure mode and a wear rate distribution on sensor data corresponding to the asset; (b) updating, by the one or more processors executing the BRIE, the predicted health distribution based on (i) an observed state distribution corresponding to an observed state associated with the asset that is indicative of a health state of the asset represented by the predicted health distribution and (ii) a normalized value representative of a probability of the observed state over one or more health values of the asset; (c) generating, by the one or more processors executing the BRIE, a survival curve of the asset based on the predicted health distribution and a set of wear rates, the survival curve including predictions of a survival probability for the asset at a plurality of future points; iteratively performing (a)-(c) for each failure mode of the set of failure modes; aggregating, by the one or more processors executing the BRIE, the survival curve for each failure mode into an aggregate survival curve of the asset; and causing, by the one or more processors, a client device to display a visual representation of the aggregate survival curve of the asset.

10. The computer-implemented method of aspect 9, wherein updating the predicted health distribution further comprises: aggregating, by the BRIE, a set of observation values during a time period associated with the predicted health distribution, wherein each observation value included in the set of observation values is representative of one or more observed states of an asset component during a portion of the time period; and generating, by executing the BRIE, the observed state distribution based on the set of observation values.

11. The computer-implemented method of any of aspects 9-10, wherein each failure mode corresponds to a respective probability of disabling the asset, and wherein aggregating the survival curve for each failure mode into the aggregate survival curve of the asset further comprises: applying, by executing the BRIE, a respective disabling weighting value to the survival curve for each failure mode prior to aggregating the survival curve for each failure mode into the aggregate survival curve, wherein the respective disabling weighting value is based on a probability of disabling the asset corresponding to the failure mode represented by the survival curve.

12. The computer-implemented method of any of aspects 9-11, wherein updating the predicted health distribution further comprises: comparing, by executing the BRIE, the observed state to a set of prior observed states obtained within a time period threshold relative to the observed state; determining, by executing the BRIE, whether or not the observed state is dependent from the set of prior observed states; and responsive to determining that the observed state is dependent from the set of prior observed states, applying, by executing the BRIE, a dependency weighting value to the observed state that reduces an impact of the observed state on the predicted health distribution.

13. The computer-implemented method of any of aspects 9-12, further comprising updating the predicted health distribution by: analyzing, by executing the BRIE, a set of prior observed states and a set of prior health states to evaluate a plurality of underlying causes of the observed state; determining, by executing the BRIE, a predominant cause of the plurality of underlying causes of the observed state; and applying, by executing the BRIE, a cause weighting value to the observed state that adjusts an impact of the observed state on the predicted health distribution, wherein the weighting cause value is based on the predominant cause.

14. The computer-implemented method of any of aspects 9-13, wherein the survival curve for each failure mode and the aggregate survival curve of the asset include predictions of the survival probability for the asset at the plurality of future points based on a plurality of maintenance potentials that includes: (i) no maintenance, (ii) planned maintenance, (iii) unplanned maintenance, and (iv) failure prior to maintenance.

15. The computer-implemented method of any of aspects 9-14, further comprising: sampling, by the one or more processors executing the BRIE, the prior health distribution and the wear rate distribution at a same plurality of points prior to generating the predicted health distribution; generating, by the one or more processors executing the BRIE, the predicted health distribution based on the same plurality of points of both the prior health distribution and the wear rate distribution; sampling, by the one or more processors executing the BRIE, the observed state distribution at the same plurality of points prior to updating the predicted health distribution; updating, by the one or more processors executing the BRIE, the predicted health distribution based on the same plurality of points of the observed state distribution; generating, by the one or more processors executing the BRIE, the survival curve based on the same plurality of points of the predicted health distribution; and interpolating, by the one or more processors executing the BRIE, the aggregate survival curve from the same plurality of points of each survival curve prior to causing the client device to display the visual representation of the aggregate survival curve of the asset.

16. A tangible, non-transitory computer-readable medium storing instructions for generating survival curves for an asset, that when executed by one or more processors cause the one or more processors to: (a) generate, by executing a Bayesian risk inference engine (BRIE), a predicted health distribution of an asset for a failure mode of a set of failure modes based on a prior health distribution of the asset for the failure mode and a wear rate distribution based on sensor data corresponding to the asset; (b) update, by executing the BRIE, the predicted health distribution based on (i) an observed state distribution corresponding to an observed state associated with the asset that is indicative of a health state of the asset represented by the predicted health distribution and (ii) a normalized value representative of a probability of the observed state over one or more health values of the asset; (c) generate, by executing the BRIE, a survival curve of the asset based on the predicted health distribution and a set of wear rates, the survival curve including predictions of a survival probability for the asset at a plurality of future points; iteratively perform (a)-(c) for each failure mode of the set of failure modes; aggregate, by executing the BRIE, the survival curve for each failure mode into an aggregate survival curve of the asset; and cause a client device to display a visual representation of the aggregate survival curve of the asset.

17. The tangible, non-transitory computer-readable medium of aspect 16, wherein the instructions, when executed by the one or more processors, further cause the one or more processors to update the predicted health distribution by: aggregating, by executing the BRIE, a set of observation values during a time period associated with the predicted health distribution, wherein each observation value included in the set of observation values is representative of one or more observed states of an asset component during a portion of the time period; and generating, by executing the BRIE, the observed state distribution based on the set of observation values.

18. The tangible, non-transitory computer-readable medium of any of aspects 16-17, wherein each failure mode corresponds to a respective probability of disabling the asset, and the instructions, when executed by the one or more processors, further cause the one or more processors to aggregate the survival curve for each failure mode into the aggregate survival curve of the asset by: applying, by executing the BRIE, a respective disabling weighting value to the survival curve for each failure mode prior to aggregating the survival curve for each failure mode into the aggregate survival curve, wherein the respective disabling weighting value is based on a probability of disabling the asset corresponding to the failure mode represented by the survival curve.

19. The tangible, non-transitory computer-readable medium of any of aspects 16-18, wherein the instructions, when executed by the one or more processors, further cause the one or more processors to update the predicted health distribution by: comparing, by executing the BRIE, the observed state to a set of prior observed states obtained within a time period threshold relative to the observed state; determining, by executing the BRIE, whether or not the observed state is dependent from the set of prior observed states; and responsive to determining that the observed state is dependent from the set of prior observed states, applying, by executing the BRIE, a dependency weighting value to the observed state that reduces an impact of the observed state on the predicted health distribution.

20. The tangible, non-transitory computer-readable medium of any of aspects 16-19, wherein the instructions, when executed by the one or more processors, further cause the one or more processors to update the predicted health distribution by: analyzing, by executing the BRIE, a set of prior observed states and a set of prior health states to evaluate a plurality of underlying causes of the observed state; determining, by executing the BRIE, a predominant cause of the plurality of underlying causes of the observed state; and applying, by executing the BRIE, a cause weighting value to the observed state that adjusts an impact of the observed state on the predicted health distribution, wherein the weighting cause value is based on the predominant cause.

ADDITIONAL CONSIDERATIONS

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" or "hardware component" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computing platform for generating survival curves for an asset comprising:
   a communication interface;
   one or more processors;
   a non-transitory computer-readable medium storing a Bayesian risk inference engine (BRIE); and
   program instructions stored on the non-transitory computer-readable medium that are executable by the one or more processors to cause the computing platform to:
   (a) generate, by executing the BRIE, a predicted health distribution of an asset for a failure mode of a set of failure modes based on a prior health distribution of the asset for the failure mode and a wear rate distribution based on sensor data corresponding to the asset,
   (b) update, by executing the BRIE, the predicted health distribution based on (i) an observed state distribution corresponding to an observed state associated with the asset that is indicative of a health state of the asset represented by the predicted health distribution and (ii) a normalized value representative of a probability of the observed state over one or more health values of the asset,
   (c) generate, by executing the BRIE, a survival curve of the asset based on the predicted health distribution and a set of wear rates, the survival curve including predictions of a survival probability for the asset at a plurality of future points,
   iteratively perform (a)-(c) for each failure mode of the set of failure modes,
   aggregate, by executing the BRIE, the survival curve for each failure mode into an aggregate survival curve of the asset, and
   cause a client device to display on a display screen a visual representation of the aggregate survival curve of the asset, the visual representation depicting on the display screen predicted points of time when the asset is predicted to fail.

2. The computing platform of claim 1, wherein the program instructions, when executed by the one or more processors, further cause the computing platform to update the predicted health distribution by:

aggregating, by executing the BRIE, a set of observation values during a time period associated with the predicted health distribution, wherein each observation value included in the set of observation values is representative of one or more observed states of an asset component during a portion of the time period; and generating, by executing the BRIE, the observed state distribution based on the set of observation values.

3. The computing platform of claim 1, wherein each failure mode corresponds to a respective probability of disabling the asset, and the program instructions, when executed by the one or more processors, further cause the computing platform to aggregate the survival curve for each failure mode into the aggregate survival curve of the asset by:

applying, by executing the BRIE, a respective disabling weighting value to the survival curve for each failure mode prior to aggregating the survival curve for each failure mode into the aggregate survival curve, wherein the respective disabling weighting value is based on a probability of disabling the asset corresponding to the failure mode represented by the survival curve.

4. The computing platform of claim 1, wherein the program instructions, when executed by the one or more processors, further cause the computing platform to update the predicted health distribution by:

comparing, by executing the BRIE, the observed state to a set of prior observed states obtained within a time period threshold relative to the observed state;

determining, by executing the BRIE, whether or not the observed state is dependent from the set of prior observed states; and responsive to determining that the observed state is dependent from the set of prior observed states, applying, by executing the BRIE, a dependency weighting value to the observed state that reduces an impact of the observed state on the predicted health distribution.

5. The computing platform of claim 1, wherein the program instructions, when executed by the one or more processors, further cause the computing platform to update the predicted health distribution by:

analyzing, by executing the BRIE, a set of prior observed states and a set of prior health states to evaluate a plurality of underlying causes of the observed state;

determining, by executing the BRIE, a predominant cause of the plurality of underlying causes of the observed state; and applying, by executing the BRIE, a cause weighting value to the observed state that adjusts an impact of the observed state on the predicted health distribution, wherein the weighting cause value is based on the predominant cause.

6. The computing platform of claim 1, wherein the survival curve for each failure mode and the aggregate survival curve of the asset include predictions of the survival probability for the asset at the plurality of future points based on a plurality of maintenance potentials that includes: (i) no maintenance, (ii) planned maintenance, (iii) unplanned maintenance, and (iv) failure prior to maintenance.

7. The computing platform of claim 1, wherein the program instructions, when executed by the one or more processors, further cause the computing platform to:

sample, by executing the BRIE, the prior health distribution and the wear rate distribution at a same plurality of points prior to generating the predicted health distribution;

generate, by executing the BRIE, the predicted health distribution based on the same plurality of points of both the prior health distribution and the wear rate distribution;

sample, by executing the BRIE, the observed state distribution at the same plurality of points prior to updating the predicted health distribution;

update, by executing the BRIE, the predicted health distribution based on the same plurality of points of the observed state distribution;

generate, by executing the BRIE, the survival curve based on the same plurality of points of the predicted health distribution; and interpolate, by executing the BRIE, the aggregate survival curve from the same plurality of points of each survival curve prior to causing the client device to display the visual representation of the aggregate survival curve of the asset.

8. The computing platform of claim 1, wherein the predicted health distribution is a first predicted health distribution generated at a first time, and at a second time subsequent to the first time, the first predicted health distribution is the prior health distribution.

9. A computer-implemented method for generating survival curves for an asset comprising:

(a) generating, by one or more processors executing a Bayesian risk inference engine (BRIE), a predicted health distribution of an asset for a failure mode of a set of failure modes based on a prior health distribution of the asset for the failure mode and a wear rate distribution based on sensor data corresponding to the asset;

(b) updating, by the one or more processors executing the BRIE, the predicted health distribution based on (i) an observed state distribution corresponding to an observed state associated with the asset that is indicative of a health state of the asset represented by the predicted health distribution and (ii) a normalized value representative of a probability of the observed state over one or more health values of the asset;

(c) generating, by the one or more processors executing the BRIE, a survival curve of the asset based on the predicted health distribution and a set of wear rates, the survival curve including predictions of a survival probability for the asset at a plurality of future points;

iteratively performing (a)-(c) for each failure mode of the set of failure modes;

aggregating, by the one or more processors executing the BRIE, the survival curve for each failure mode into an aggregate survival curve of the asset; and causing, by the one or more processors, a client device to display on a display screen a visual representation of the aggregate survival curve of the asset, the visual representation depicting on the display screen predicted points of time when the asset is predicted to fail.

10. The computer-implemented method of claim 9, wherein updating the predicted health distribution further comprises:

aggregating, by executing the BRIE, a set of observation values during a time period associated with the predicted health distribution, wherein each observation value included in the set of observation values is representative of one or more observed states of an asset component during a portion of the time period; and generating, by executing the BRIE, the observed state distribution based on the set of observation values.

11. The computer-implemented method of claim 9, wherein each failure mode corresponds to a respective probability of disabling the asset, and wherein aggregating the survival curve for each failure mode into the aggregate survival curve of the asset further comprises:
applying, by executing the BRIE, a respective disabling weighting value to the survival curve for each failure mode prior to aggregating the survival curve for each failure mode into the aggregate survival curve, wherein the respective disabling weighting value is based on a probability of disabling the asset corresponding to the failure mode represented by the survival curve.

12. The computer-implemented method of claim 9, wherein updating the predicted health distribution further comprises:
comparing, by executing the BRIE, the observed state to a set of prior observed states obtained within a time period threshold relative to the observed state;
determining, by executing the BRIE, whether or not the observed state is dependent from the set of prior observed states; and
responsive to determining that the observed state is dependent from the set of prior observed states, applying, by executing the BRIE, a dependency weighting value to the observed state that reduces an impact of the observed state on the predicted health distribution.

13. The computer-implemented method of claim 9, further comprising updating the predicted health distribution by:
analyzing, by executing the BRIE, a set of prior observed states and a set of prior health states to evaluate a plurality of underlying causes of the observed state;
determining, by executing the BRIE, a predominant cause of the plurality of underlying causes of the observed state; and
applying, by executing the BRIE, a cause weighting value to the observed state that adjusts an impact of the observed state on the predicted health distribution, wherein the weighting cause value is based on the predominant cause.

14. The computer-implemented method of claim 9, wherein the survival curve for each failure mode and the aggregate survival curve of the asset include predictions of the survival probability for the asset at the plurality of future points based on a plurality of maintenance potentials that includes: (i) no maintenance, (ii) planned maintenance, (iii) unplanned maintenance, and (iv) failure prior to maintenance.

15. The computer-implemented method of claim 9, further comprising:
sampling, by the one or more processors executing the BRIE, the prior health distribution and the wear rate distribution at a same plurality of points prior to generating the predicted health distribution;
generating, by the one or more processors executing the BRIE, the predicted health distribution based on the same plurality of points of both the prior health distribution and the wear rate distribution;
sampling, by the one or more processors executing the BRIE, the observed state distribution at the same plurality of points prior to updating the predicted health distribution;
updating, by the one or more processors executing the BRIE, the predicted health distribution based on the same plurality of points of the observed state distribution;
generating, by the one or more processors executing the BRIE, the survival curve based on the same plurality of points of the predicted health distribution; and
interpolating, by the one or more processors executing the BRIE, the aggregate survival curve from the same plurality of points of each survival curve prior to causing the client device to display the visual representation of the aggregate survival curve of the asset.

16. A tangible, non-transitory computer-readable medium storing instructions for generating survival curves for an asset, that when executed by one or more processors cause the one or more processors to:
(a) generate, by executing a Bayesian risk inference engine (BRIE), a predicted health distribution of an asset for a failure mode of a set of failure modes based on a prior health distribution of the asset for the failure mode and a wear rate distribution based on sensor data corresponding to the asset;
(b) update, by executing the BRIE, the predicted health distribution based on (i) an observed state distribution corresponding to an observed state associated with the asset that is indicative of a health state of the asset represented by the predicted health distribution and (ii) a normalized value representative of a probability of the observed state over one or more health values of the asset;
(c) generate, by executing the BRIE, a survival curve of the asset based on the predicted health distribution and a set of wear rates, the survival curve including predictions of a survival probability for the asset at a plurality of future points;
iteratively perform (a)-(c) for each failure mode of the set of failure modes;
aggregate, by executing the BRIE, the survival curve for each failure mode into an aggregate survival curve of the asset; and
cause a client device to display on a display screen a visual representation of the aggregate survival curve of the asset, the visual representation depicting on the display screen predicted points of time when the asset is predicted to fail.

17. The tangible, non-transitory computer-readable medium of claim 16, wherein the instructions, when executed by the one or more processors, further cause the one or more processors to update the predicted health distribution by:
aggregating, by executing the BRIE, a set of observation values during a time period associated with the predicted health distribution, wherein each observation value included in the set of observation values is representative of one or more observed states of an asset component during a portion of the time period; and
generating, by executing the BRIE, the observed state distribution based on the set of observation values.

18. The tangible, non-transitory computer-readable medium of claim 16, wherein each failure mode corresponds to a respective probability of disabling the asset, and the instructions, when executed by the one or more processors, further cause the one or more processors to aggregate the survival curve for each failure mode into the aggregate survival curve of the asset by:
applying, by executing the BRIE, a respective disabling weighting value to the survival curve for each failure mode prior to aggregating the survival curve for each failure mode into the aggregate survival curve, wherein the respective disabling weighting value is based on a probability of disabling the asset corresponding to the failure mode represented by the survival curve.

19. The tangible, non-transitory computer-readable medium of claim 16, wherein the instructions, when executed by the one or more processors, further cause the one or more processors to update the predicted health distribution by:
- comparing, by executing the BRIE, the observed state to a set of prior observed states obtained within a time period threshold relative to the observed state;
- determining, by executing the BRIE, whether or not the observed state is dependent from the set of prior observed states; and
- responsive to determining that the observed state is dependent from the set of prior observed states, applying, by executing the BRIE, a dependency weighting value to the observed state that reduces an impact of the observed state on the predicted health distribution.

20. The tangible, non-transitory computer-readable medium of claim 16, wherein the instructions, when executed by the one or more processors, further cause the one or more processors to update the predicted health distribution by:
- analyzing, by executing the BRIE, a set of prior observed states and a set of prior health states to evaluate a plurality of underlying causes of the observed state;
- determining, by executing the BRIE, a predominant cause of the plurality of underlying causes of the observed state; and
- applying, by executing the BRIE, a cause weighting value to the observed state that adjusts an impact of the observed state on the predicted health distribution, wherein the weighting cause value is based on the predominant cause.

* * * * *